(12) United States Patent
Ueno et al.

(10) Patent No.: US 9,608,295 B2
(45) Date of Patent: Mar. 28, 2017

(54) LITHIUM-ION SECONDARY BATTERY AND METHOD OF MANUFACTURING THE SAME

(71) Applicant: Toyota Jidosha Kabushiki Kaisha, Toyota-shi, Aichi (JP)

(72) Inventors: Yukiyoshi Ueno, Toyota (JP); Hideki Sano, Ikdea (JP); Kaoru Inoue, Hirakata (JP); Hideaki Fujita, Kyotanabe (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 263 days.

(21) Appl. No.: 14/589,367

(22) Filed: Jan. 5, 2015

(65) Prior Publication Data

US 2015/0194705 A1  Jul. 9, 2015

(30) Foreign Application Priority Data

Jan. 8, 2014 (JP) ................................ 2014-001751

(51) Int. Cl.
*H01M 4/00* (2006.01)
*H01M 10/0587* (2010.01)
(Continued)

(52) U.S. Cl.
CPC ..... *H01M 10/0587* (2013.01); *H01M 2/0217* (2013.01); *H01M 2/14* (2013.01);
(Continued)

(58) Field of Classification Search
CPC ......... H01M 10/0587; H01M 10/0431; H01M 10/0525; H01M 2/0217; H01M 2/14; Y02E 60/122; Y02P 70/54; Y10T 29/49004
See application file for complete search history.

(56) References Cited

U.S. PATENT DOCUMENTS

| | | | | |
|---|---|---|---|---|
| 2010/0216001 A1* | 8/2010 | Byun | ............ | H01M 2/263 429/94 |
| 2010/0227211 A1* | 9/2010 | Chang | ............ | H01M 2/266 429/152 |

(Continued)

FOREIGN PATENT DOCUMENTS

| | | |
|---|---|---|
| CN | 102148407 A | 8/2011 |
| JP | 10-261441 A | 9/1998 |

(Continued)

*Primary Examiner* — Raymond Alejandro
(74) *Attorney, Agent, or Firm* — Sughrue Mion, PLLC

(57) ABSTRACT

A lithium-ion secondary battery (10) includes a wound electrode assembly (40) having a positive electrode current collector foil (51) and a negative electrode current collector foil 61). An edge portion (52) of the positive electrode current collector foil (51) is exposed in a spiral form at one end of a winding axis (WL). An edge portion (62) of the negative electrode current collector foil (61) is exposed in a spiral form at the other end of the winding axis (WL). The spirally exposed edge portion (52) of the positive electrode current collector foil (51) is divided and gathered into a plurality of parts divided at at least one of a plurality of gaps (S), excluding a central portion (WC) containing the winding axis (WL), provided between wound layers of the positive electrode current collector foil (51) stacked in a direction orthogonal to the winding axis (WL). Likewise, the spirally exposed edge portion (62) of the negative electrode current collector foil (61) is divided and gathered into a plurality of parts divided at at least one of a plurality of gaps (S), excluding the central portion (WC) containing the winding axis (WL), provided between wound layers of the negative electrode current collector foil (61) stacked in a direction orthogonal to the winding axis (WL).

16 Claims, 10 Drawing Sheets

(51) Int. Cl.
*H01M 10/0525* (2010.01)
*H01M 10/04* (2006.01)
*H01M 2/02* (2006.01)
*H01M 2/14* (2006.01)

(52) U.S. Cl.
CPC ... *H01M 10/0431* (2013.01); *H01M 10/0525* (2013.01); *Y02E 60/122* (2013.01); *Y02P 70/54* (2015.11); *Y02T 10/7011* (2013.01); *Y10T 29/49004* (2015.01); *Y10T 29/49108* (2015.01)

(56) References Cited

U.S. PATENT DOCUMENTS

| | | | |
|---|---|---|---|
| 2011/0195287 A1 | 8/2011 | Kamifuji et al. | |
| 2013/0309566 A1* | 11/2013 | Umehara | H01M 4/13 429/211 |
| 2013/0344374 A1* | 12/2013 | Morishima | H01M 4/13 429/144 |

FOREIGN PATENT DOCUMENTS

| | | |
|---|---|---|
| JP | 2002-25626 A | 1/2002 |
| JP | 2008-41526 A | 2/2008 |
| JP | 2012-243455 A | 12/2012 |
| JP | 2013-045636 A | 3/2013 |
| JP | 2013-054998 A | 3/2013 |

* cited by examiner

LITHIUM-ION SECONDARY BATTERY AND METHOD OF MANUFACTURING THE SAME

TECHNICAL FIELD

The present invention relates to a lithium-ion secondary battery and a method of manufacturing the battery. In the present description, the term "secondary battery" refers to a repeatedly rechargeable battery in general. The term "lithium-ion secondary battery" refers to a secondary battery that uses lithium ions as the electrolyte ions and implements charging and discharging by the transfer of electric charge which is associated with the transfer of the lithium ions between the positive and negative electrodes. The battery commonly referred to as "lithium secondary battery" can be encompassed by the lithium-ion secondary battery of the present description.

The present application claims priority from Japanese Patent Application No. 2014-001751, filed on Jan. 8, 2014, which is incorporated by reference herein in its entirety.

BACKGROUND ART

A prismatic battery having a flat-shaped wound electrode assembly is disclosed in, for example, JP 2013-054998 A. The positive electrode sheet and the negative electrode sheet of the wound electrode assembly disclosed therein have respective mixture layers (also referred to herein as electrode active material layers) formed on respective strip-shaped metal foils. An exposed portion in which the metal foil is exposed is formed along a longer side of the strip-shaped metal foil. The exposed portion of the positive electrode sheet metal foil and the exposed portion of the negative electrode sheet metal foil jut out from the separators in opposite directions at the opposite ends of the winding axis. In these publications, each of the exposed portion of the positive electrode sheet and the exposed portion of the negative electrode sheet metal is divided at the winding center into two sets along the flat thickness direction. Each of the two sets of exposed portions, which are divided along the flat thickness direction, is gathered in the thickness direction.

JP 2013-054998 A discloses the exposed portion of the metal foil in which the starting end of winding is fixed to the inner circumferential surface of the exposed portion that is wound to be an outer peripheral side. JP 2013-045636 also discloses an example of the wound electrode assembly having a construction in which each of the exposed portions of the positive and negative electrode sheet metal foils is divided and gathered into two sets at the winding center along the flat thickness direction.

CITATION LIST

Patent Literature

[Patent Literature 1] JP 2013-054998 A
[Patent Literature 2] JP 2013-045636 A

SUMMARY OF INVENTION

Technical Problem

The present inventors have found that the wound electrode assembly having the above-described construction can cause an event in which the positive electrode active material dissolves from the positive electrode sheet and deposits on the negative electrode sheet at the starting end of winding during, for example, high temperature aging before shipping. Such an event can be a cause of micro-short circuits between the negative electrode active material and the positive electrode sheet when the deposit of the positive electrode active material on the negative electrode sheet ends up filling the pores in the separators. These micro-short circuits can be detected by an inspection before shipping, such as the above-mentioned high temperature aging. However, the inspection before shipping such as the high temperature aging (inspecting step) is originally intended to detect the defective products resulting from metallic contaminants. If micro-short circuits are detected in the inspection before shipping such as the high temperature aging because of the event in which the positive electrode active material dissolves from the positive electrode sheet and deposits on the negative electrode sheet at the starting end of winding, such an event may be a cause of poor product yield.

Solution to Problem

A lithium-ion secondary battery proposed herein comprises a battery case, a wound electrode assembly enclosed in the battery case, and an electrolyte solution enclosed in the battery case. The wound electrode assembly includes a positive electrode current collector foil including an edge portion exposed in a spiral form at one end of a winding axis, and a negative electrode current collector foil including an edge portion exposed in a spiral form at the other end of the winding axis. The spirally exposed edge portion of the positive electrode current collector foil is divided and gathered into a plurality of parts at at least one of a plurality of gaps, excluding a central portion containing the winding axis, provided between wound layers of the positive electrode current collector foil stacked in a direction orthogonal to the winding axis. The spirally exposed edge portion of the negative electrode current collector foil is divided and gathered into a plurality of parts at at least one of a plurality of gaps, excluding a central portion containing the winding axis, provided between wound layers of the negative electrode current collector foil stacked in a direction orthogonal to the winding axis. Such a lithium-ion secondary battery does not easily cause a micro-short circuit resulting from the positive electrode active material that dissolves from the positive electrode sheet and deposits on the negative electrode sheet at the starting end of winding (i.e., at the winding starting end portion).

Here, from the viewpoint of preventing the micro-short circuits resulting from the positive electrode active material dissolving from the positive electrode sheet and depositing on the negative electrode sheet, it is possible that, for example, two edge parts within the spirally exposed edge portion of the positive electrode current collector foil may be gathered into one piece, the two edge parts being positioned respectively on opposite sides of the central portion along a direction orthogonal to the winding axis. It is also possible that at least a portion of the spirally exposed edge portion of the positive electrode current collector foil that extends from the winding starting end thereof to the first turn thereof may be gathered into one piece. It is also possible that the winding starting end portion of the spirally exposed edge portion of the positive electrode current collector foil may be disposed inside one of the gathered parts of the positive electrode current collector foil. It is also possible that at least a portion of the spirally exposed edge portion of the positive electrode current collector foil that extends from the winding starting end thereof to the second turn thereof may be gathered into one piece. It is also desirable that the spirally exposed edge portion of the positive electrode current collector foil may be divided at one of a plurality of gaps provided in a direction orthogonal to the winding axis, the one of the plurality of gaps being selected from first to fourth gaps from the central portion containing the winding axis.

Furthermore, in this case, it is also possible that two edge parts within the spirally exposed edge portion 62 of the negative electrode current collector foil be gathered into one piece, the two edge parts being positioned respectively on opposite sides of the central portion along a direction orthogonal to the winding axis. It is also possible that at least a portion of the spirally exposed edge portion of the negative electrode current collector foil that extends from the winding starting end thereof to the first turn thereof may be gathered into one piece. It is also possible that the winding starting end portion of the spirally exposed edge portion of the negative electrode current collector foil may be disposed inside one of the gathered parts of the negative electrode current collector foil. It is also possible that at least a portion of the spirally exposed edge portion of the negative electrode current collector foil that extends from the winding starting end thereof to the second turn thereof may be gathered into one piece. It is also desirable that the spirally exposed edge portion of the negative electrode current collector foil may be divided at one of a plurality of gaps provided in a direction orthogonal to the winding axis, the one of the plurality of gaps being selected from first to fourth gaps from the central portion containing the winding axis.

In addition, the wound electrode assembly may have a positive electrode active material layer retained on a strip-shaped positive electrode current collector foil, and a negative electrode active material layer retained on a strip-shaped negative electrode current collector foil. It is also possible that the positive electrode current collector foil and the negative electrode current collector foil may be oriented in a common longitudinal direction, and may be stacked together with separators interposed between the positive electrode active material layer and the negative electrode active material layer, and may be wound around the winding axis set along a width direction of the strip-shaped positive electrode current collector foil. Here, it is desirable that in the central portion containing the winding axis, the negative electrode active material layer be disposed closer to the winding axis than the positive electrode active material layer. Furthermore, it is desirable that the winding starting end portion of the negative electrode active material layer jut out from the winding starting end portion of the positive electrode active material layer in the winding direction around the winding axis.

In addition, it is desirable that the battery case be a prismatic case having an accommodating space in a flat parallelepiped shape. In this case, it is desirable that the wound electrode assembly be enclosed in the battery case in a flat condition along a plane containing the winding axis. It is desirable that each of the gathered part of the positive electrode current collector foil and the gathered part of the negative electrode current collector foil be gathered into a linear line shape along the plane.

It is also possible that a positive electrode terminal and a negative electrode terminal may be attached to the battery case. In this case, the positive electrode terminal may include a retaining portion retaining at least two gathered parts of the positive electrode current collector foil. The negative electrode terminal may include a retaining portion retaining at least two gathered parts of the negative electrode current collector foil.

A method of manufacturing a lithium-ion secondary battery proposed herein may include the steps of: preparing a wound electrode assembly; attaching a positive electrode terminal to the wound electrode assembly; and attaching a negative electrode terminal to the wound electrode assembly. The prepared wound electrode assembly may include, for example, a positive electrode current collector foil having an edge portion exposed in a spiral form at one end of a winding axis, and a negative electrode current collector foil having an edge portion exposed in a spiral form at the other end of the winding axis. It is desirable that the step of attaching a positive electrode terminal include: dividing and gathering the spirally exposed edge portion of the positive electrode current collector foil into a plurality of parts at at least one of a plurality of gaps excluding the central portion containing the winding axis and provided between wound layers of the positive electrode current collector foil in a direction orthogonal to a winding axis; and attaching the edge portion to the positive electrode terminal. Furthermore, it is desirable that the step of attaching a negative electrode terminal include: dividing and gathering the spirally exposed edge portion of the negative electrode current collector foil into a plurality of parts at at least one of a plurality of gaps excluding the central portion containing the winding axis and provided between wound layers of the negative electrode current collector foil in a direction orthogonal to a winding axis; and attaching the edge portion to the negative electrode terminal. Furthermore, in this case, the method of manufacturing the lithium-ion secondary battery may also include a step of inspecting a lithium-ion secondary battery prepared in the foregoing manufacturing method by subjecting to the lithium-ion secondary battery to a high temperature aging.

DESCRIPTION OF EMBODIMENTS

Figure 1:
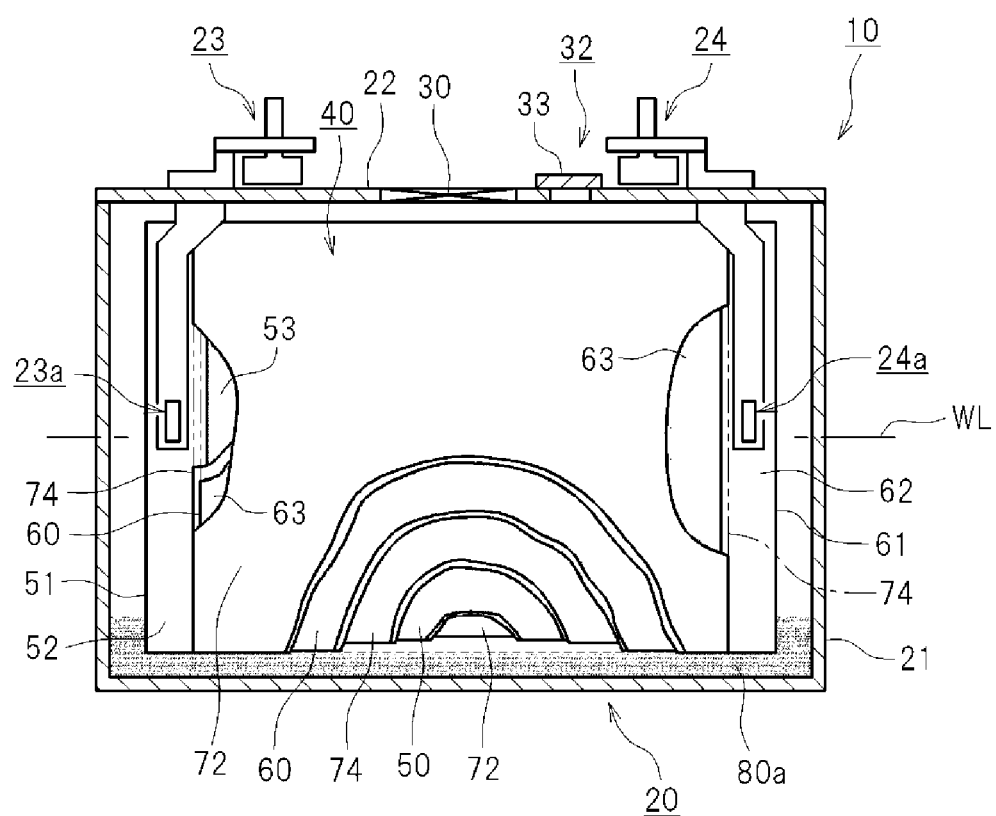
FIG. 1 is a cross-sectional view illustrating a lithium-ion secondary battery 10.

The following description is given to illustrate an example of the embodiments of a lithium-ion secondary battery proposed herein. The embodiments described herein are not intended to limit the present invention. The drawings are depicted schematically, and the dimensional relationship (length, width, thickness, and the like) in the drawings, for example, does not necessarily reflect actual dimensional relationship. The parts and components that exhibit the same effects are denoted by the same reference symbols, and repetitive description thereof may be omitted as appropriate.

First, an example of the structure of an applicable lithium-ion secondary battery 10 will be described first. Thereafter, the structure proposed herein will be described about the lithium-ion secondary battery 10.

<<Lithium-Ion Secondary Battery 10>>

Figure 2:
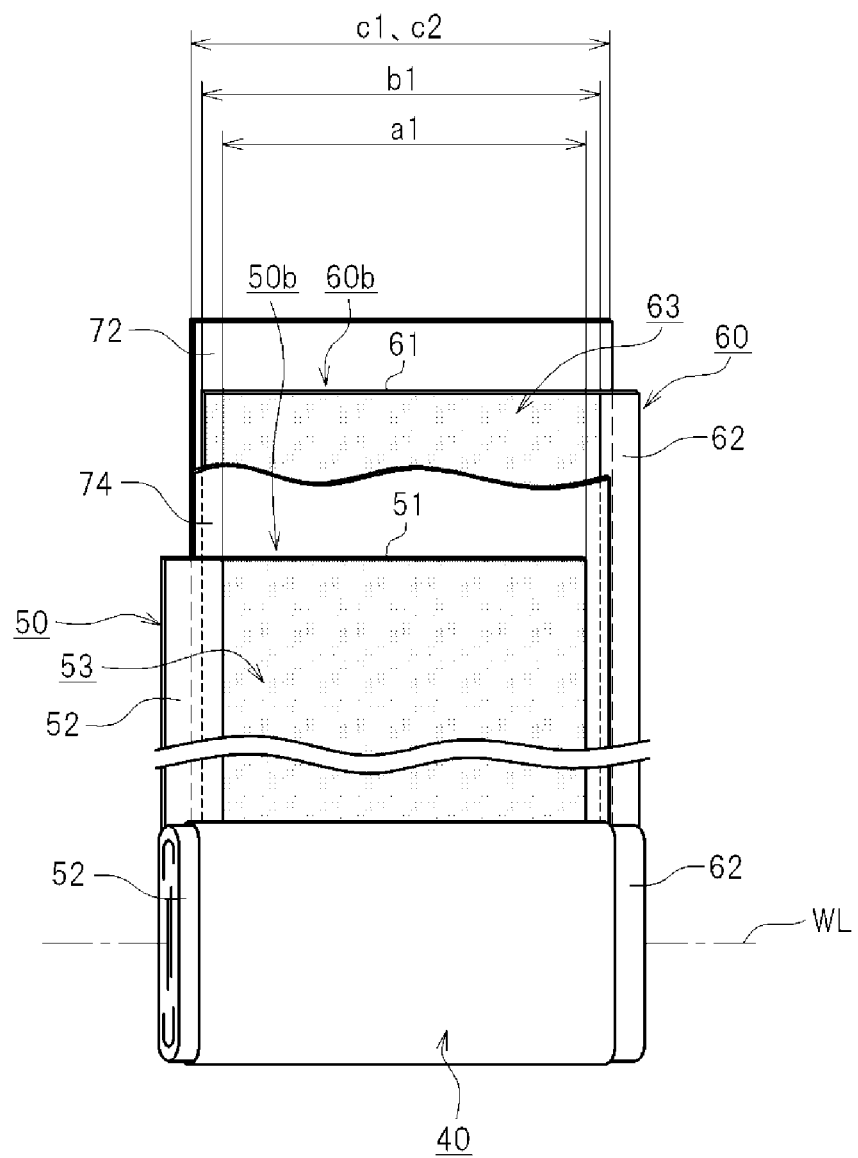
FIG. 2 is a view illustrating an electrode assembly 40 incorporated in the lithium-ion secondary battery 10.

FIG. 1 is a cross-sectional view illustrating a lithium-ion secondary battery 10. FIG. 2 is a view illustrating an electrode assembly 40 incorporated in the lithium-ion secondary battery 10. It should be noted that the lithium-ion secondary battery 10 depicted in FIGS. 1 and 2 merely illustrates an example of the lithium-ion secondary battery to which the present invention can be applied, and it does not particularly limit the lithium-ion secondary battery to which the present invention can be applied.

As illustrated in FIG. 1, the lithium-ion secondary battery 10 has a battery case 20 and an electrode assembly 40 (wound electrode assembly in FIG. 1).

<<Battery Case 20>>

The battery case 20 has a case main body 21 and a sealing plate 22. The case main body 21 has a box shape one end of which has an opening. The case main body 21 has a closed-bottom rectangular parallelepiped shape. The one face of the rectangular parallelepiped shape, which corresponds to the upper face of the lithium-ion secondary battery 10 in the condition of normal use, is open. In this embodiment, a rectangular opening is formed in the case main body 21. The sealing plate 22 is a member for closing the opening of the case main body 21. The sealing plate 22 comprises a substantially rectangular plate. The sealing plate 22 is welded to the peripheral edge of the opening of the case main body 21 to form the battery case 20 in a substantially hexahedral shape.

For the material of the battery case 20, it is preferable to use a lightweight and highly conductive metal material. Examples of such a metal material include aluminum, stainless steel, and nickel-plated steel. The battery case 20 (including the case main body 21 and the sealing plate 22) of the present embodiment is made of aluminum or an alloy mainly composed of aluminum.

In the example shown in FIG. 1, a positive electrode terminal 23 (external terminal) and a negative electrode terminal 24 (external terminal) are attached to the sealing plate 22. The sealing plate 22 has a safety vent 30 and a filling port 32. The safety vent 30 is so constructed that the internal pressure of the battery case 20 can be released when the internal pressure increases to a predetermined level or higher (for example, the designed valve opening pressure is from about 0.3 MPa to about 1.0 MPa). FIG. 1 illustrates the battery in which the filling port 32 is sealed by a sealing material 33 after an electrolyte solution 80 has been filled therein. The battery case 20 as described above accommodates the electrode assembly 40.

<<Electrode Assembly 40 (Wound Electrode Assembly)>>

As illustrated in FIG. 2, the electrode assembly 40 has a strip-shaped positive electrode (positive electrode sheet 50), a strip-shaped negative electrode (negative electrode sheet 60), and strip-shaped separators (separators 72 and 74).

<<Positive Electrode Sheet 50>>

The positive electrode sheet 50 has a strip-shaped positive electrode current collector foil 51 and a positive electrode active material layer 53. A metal foil suitable for the positive electrode may be used preferably for the positive electrode current collector foil 51. For the positive electrode current collector foil 51, it is possible to use, for example, a strip-shaped aluminum foil having a predetermined width and a thickness of about 15 μm. An exposed portion 52 is provided along one lateral-side edge of the positive electrode current collector foil 51. In the example shown in the figure, the positive electrode active material layer 53 is formed on both faces of the positive electrode current collector foil 51 except for the exposed portion 52 provided in the positive electrode current collector foil 51. Herein, the positive electrode active material layer 53 is retained by the positive electrode current collector foil 51, and at least a positive electrode active material is contained therein. In this embodiment, the positive electrode active material layer 53 is such that a positive electrode mixture containing the positive electrode active material is coated on the positive electrode current collector foil 51. The term "exposed portion 52" refers to a portion of the positive electrode current collector foil 51 in which the positive electrode active material layer 53 is not retained (or not coated, or not formed).

For the positive electrode active material, it is possible to use any conventional substance used for lithium-ion secondary batteries, either alone or in combination, without any particular limitation. Preferable examples include: oxides containing lithium and one or more transition metal elements (i.e., lithium-transition metal oxide), such as lithium nickel oxide (for example, $LiNiO_2$), lithium cobalt oxide (for example, $LiCoO_2$), and lithium manganese oxide ($LiMn_2O_4$); and phosphates containing lithium and one or more transition metal elements, such as lithium manganese phosphate ($LiMnPO_4$) and lithium iron phosphate ($LiFePO_4$).

<Conductive Agent>

Examples of the conductive agent include carbon materials, such as carbon powder and carbon fiber. It is possible to use one of the just-mentioned examples of the conductive agents either alone or in combination with another one or more of the examples. Examples of the carbon powder include powders of acetylene black, oil-furnace black, graphitized carbon black, carbon black, graphite, and Ketjen Black.

<Binder>

The binder serves to bond the particles of the positive electrode active material and the particles of the conductive agent contained in the positive electrode active material layer 53 with each other, and to bond these particles with the positive electrode current collector foil 51. As the binder, it is possible to use polymers that can be dissolved or dispersed in the solvent used. For example, for the positive electrode mixture composition using an aqueous solvent, it is preferable to use water-soluble or water-dispersible polymers, preferable example of which include: cellulose-based polymers (such as carboxymethylcellulose (CMC) and hydroxypropyl methyl cellulose (HPMC)); fluoropolymers (such as polytetrafluoroethylene (PTFE) and tetrafluoroethylene-hexafluoropropylene copolymer (FEP)); and rubber materials (such as styrene-butadiene copolymer (SBR) and acrylic acid-modified SBR resin (SBR latex)), polyvinyl alcohol (PVA), and vinyl acetate copolymers. For the positive electrode mixture composition using a non-aqueous solvent, it is preferable to use polymers (such as polyvinylidene fluoride (PVDF), polyvinylidene chloride (PVDC), and polyacrylonitrile (PAN)).

<<Negative Electrode Sheet 60>>

As illustrated in FIG. 2, the negative electrode sheet 60 has a strip-shaped negative electrode current collector foil 61 and a negative electrode active material layer 63. It is possible to use a metal foil that is suitable for the negative electrode as the negative electrode current collector 61. A strip-shaped copper foil having a predetermined width and a thickness of about 10 μm is used for this negative electrode current collector foil 61. An exposed portion 62 is provided along one lateral-side edge of the negative electrode current collector foil 61. The negative electrode active material layer 63 is formed on both faces of the negative electrode current collector foil 61 except for the exposed portion 62 provided within the negative electrode current collector foil 61. The negative electrode active material layer 63 is retained by the negative electrode current collector foil 61, and at least a negative electrode active material is contained therein. In this embodiment, the negative electrode active material layer 63 is such that a negative electrode mixture containing the negative electrode active material is coated on the negative electrode current collector foil 61. The term "exposed portion 62" refers to a portion of the negative electrode current collector foil 61 in which the negative electrode active material layer 63 is not retained (or not coated, or not formed).

<Negative Electrode Active Material>

For the negative electrode active material, it is possible to use any conventional substance used for lithium-ion secondary batteries, either alone or in combination, without any particular limitation. Preferable examples include carbon-based materials, such as graphite carbons and amorphous carbons, lithium-transition metal oxides, and lithium-transition metal nitrides.

<<Separators 72 and 74>>

Each of the separators 72 and 74 is a member for separating the positive electrode sheet 50 and the negative electrode sheet 60 from each other, as illustrated in FIG. 2. In this example, each of the separators 72 and 74 is made of a strip-shaped sheet having a plurality of micropores and having a predetermined width. For the separators 72 and 74, it is possible to use, for example, either a single layer separator or a multi-layered separator, either of which comprises a porous resin film, for example, a film made of porous polyolefin-based resin. In this example, as illustrated in FIG. 2, the width b1 of the negative electrode active material layer 63 is slightly wider than the width a1 of the positive electrode active material layer 53. In addition, the width c1, c2 of the separators 72 and 74 is slightly wider than the width b1 of the negative electrode active material layer 63 (c1, c2>b1>a1).

Each of the separators 72 and 74 insulates the positive electrode sheet 53 and the negative electrode sheet 63 from each other, but permits the transfer of electrolyte. Although not shown in the drawings, each of the separators 72 and 74 may have a heat-resistant layer formed on the surface of a substrate made of a porous plastic film. The heat-resistant layer comprises a filler and a binder. The heat-resistant layer may also be referred to as HRL (heat resistance layer).

<<Fitting of Electrode Assembly 40>>

In this embodiment, the electrode assembly 40 is pressed and deformed into a flat shape along a plane containing the winding axis WL, as illustrated in FIG. 2. In the example shown in FIG. 2, the exposed portion 52 of the positive electrode current collector foil 51 and the exposed portion 62 of the negative electrode current collector foil 61 are exposed in a spiral shape from the opposite side edges of the separators 72 and 74. As illustrated in FIG. 1, in the electrode assembly 40, the positive and negative exposed portions 52 and 62, which jut out from the separators 72 and 74, are respectively to the tip portions 23a and 24a of the positive and negative internal terminals 23 and 24, which are disposed inside the battery case 20.

In the embodiment shown in FIG. 1, the wound electrode assembly 40 having a flat shape along a plane containing the winding axis WL is enclosed in the battery case 20. An electrolyte solution is also filled in the battery case 20. The electrolyte solution 80 infiltrates the inside of the electrode assembly 40 from the opposite axial ends of the winding axis WL (see FIG. 2).

<<Electrolyte Solution (Liquid Electrolyte)>>

As the electrolyte solution 80, it is possible to use the same type of non-aqueous electrolyte solution as used for conventional lithium-ion batteries, without any particular limitation. Such a non-aqueous electrolyte solution typically has a composition in which an appropriate non-aqueous solvent contains a supporting salt. Examples of the non-aqueous solvent include, either alone or in combination, ethylene carbonate (hereafter abbreviated as "EC" when appropriate), propylene carbonate, dimethyl carbonate (hereafter also abbreviated as "DMC" when appropriate), diethyl carbonate, ethyl methyl carbonate (hereafter also abbreviated as "EMC" when appropriate), 1,2-dimethoxyethane, 1,2-diethoxyethane, tetrahydrofuran, and 1,3-dioxolane. Examples of the supporting salt include lithium salts such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$. One example of the non-aqueous electrolyte solution is a non-aqueous electrolyte solution in which $LiPF_6$ is contained at a concentration of about 1 mol/L in a mixed solvent of ethylene carbonate and diethyl carbonate (e.g., a mixed solvent with a composition ratio of 1:1).

It should be noted that FIG. 1 merely shows the electrolyte solution 80 filled in the battery case 20 schematically and does not accurately show the amount of the electrolyte solution 80 filled in the battery case 20. The electrolyte solution 80 filled in the battery case 20 is sufficiently impregnated into the voids in the positive electrode active material layer 53 and those in the negative electrode active material layer 63 inside the wound electrode assembly 40.

In the lithium-ion secondary battery 10, the positive electrode current collector foil 51 and the negative electrode current collector foil 61 are electrically connected to an external device via the electrode terminals 23 and 24, which penetrate through the battery case 20. The operation of the lithium-ion secondary battery 10 during charge and during discharge will be described in the following.

<<Operation during Charge>>

During charge, the lithium-ion secondary battery 10 operates as follows. A voltage is applied between the positive electrode sheet 50 and the negative electrode sheet 60. Thereby lithium ions (Li) are released into the electrolyte solution from the positive electrode active material within the positive electrode active material layer 53, and electric charge is discharged from the positive electrode active material layer 53. The electric charge is stored in the negative electrode sheet 60. Also, the lithium ions (Li) in the electrolyte solution are absorbed and stored by the negative electrode active material within the negative electrode active material layer 63. As a result, a potential difference arises between the negative electrode sheet 60 and the positive electrode sheet 50.

<<Operation During Discharge>>

During discharge, the lithium-ion secondary battery 10 operates as follows. The potential difference between the negative electrode sheet 60 and the positive electrode sheet 50 allows electric charge to be transferred from the negative electrode sheet 60 to the positive electrode sheet 50. Also, the lithium ions stored in the negative electrode active material layer 63 are released into the electrolyte solution. In the positive electrode, the lithium ions in the electrolyte solution are absorbed by the positive electrode active material within the positive electrode active material layer 53.

In this way, during charge and discharge of the lithium-ion secondary battery 10, lithium ions are absorbed and released between the positive electrode active material in the positive electrode active material layer 53 and the negative electrode active material in the negative electrode active material layer 63. Thus, lithium ions are transferred back and forth between the positive electrode active material layer 53 and the negative electrode active material layer 63 through the electrolyte solution.

<<Characteristic Features in Vehicle Application>>

Such a lithium-ion secondary battery 10 can provide a high power with a small and lightweight construction. For this reason, such a lithium-ion secondary battery can be suitable for use as a driving power source for electric vehicles and hybrid vehicles, which requires a high output power at the time of starting or accelerating the vehicle. Moreover, the lithium-ion secondary battery 10 has a high charge efficiency and is therefore applicable to rapid charging. Consequently, the lithium-ion secondary battery 10 can be applied to an energy regeneration system that regenerates electric energy from kinetic energy at the time of decelerating (braking) the vehicle to perform charging. In addition, in vehicle applications, accelerating and decelerating are repeatedly performed particularly at the time of traveling in towns. Accordingly, when the lithium-ion secondary battery 10 is used as the driving power source for electric vehicles and hybrid vehicles, high-power discharging and rapid charging are repeated. In such applications in which charging and discharging at high rate are repeated, it is desirable that the increase in battery resistance be minimized and also the output power be kept high.

Among the vehicle applications, such applications as those for plug-in hybrid vehicles (PHVs) and electric vehicles (EVs) require that the capacity stored in charging should be increased so that the distance that can be traveled per one charging can be increased. For this reason, it is desired that the capacity of the battery be increased. It is possible that with a lithium-ion secondary battery 10 (non-aqueous electrolyte secondary battery) that has the above-described wound electrode assembly 40, a higher capacity can be achieved by increasing the number of winding turns in the wound electrode assembly 40.

<Structure of Wound Electrode Assembly 40 Having Large Number of Winding Turns>

In order to gather each of the exposed portions 52 and 62 at the opposite ends of the winding axis WL into one piece, it is necessary that the outer part of each of the exposed portions 52 and 62 be forced to be widened considerably if the wound electrode assembly 40 has a large number of winding turns. For this reason, in the wound electrode assembly 40 having a large number of winding turns, it is difficult to gather the wound layers of each of the exposed portions 52 and 62 of the positive and negative electrode current collector foils 51 and 61, which are exposed at the respective opposite ends of the winding axis WL, into one piece. For this reason, in the wound electrode assembly 40 having a large number of winding turns, each of the exposed portions 52 and 62 of the positive and negative electrode current collector foils 51 and 61 is divided and gathered into two parts, divided along the thickness direction at a winding central portion WC (hereinafter simply referred to as "central portion WC") containing the winding axis WL. Such a structure is disclosed in, for example, Patent Literatures 1 and 2 above.

Figure 3:
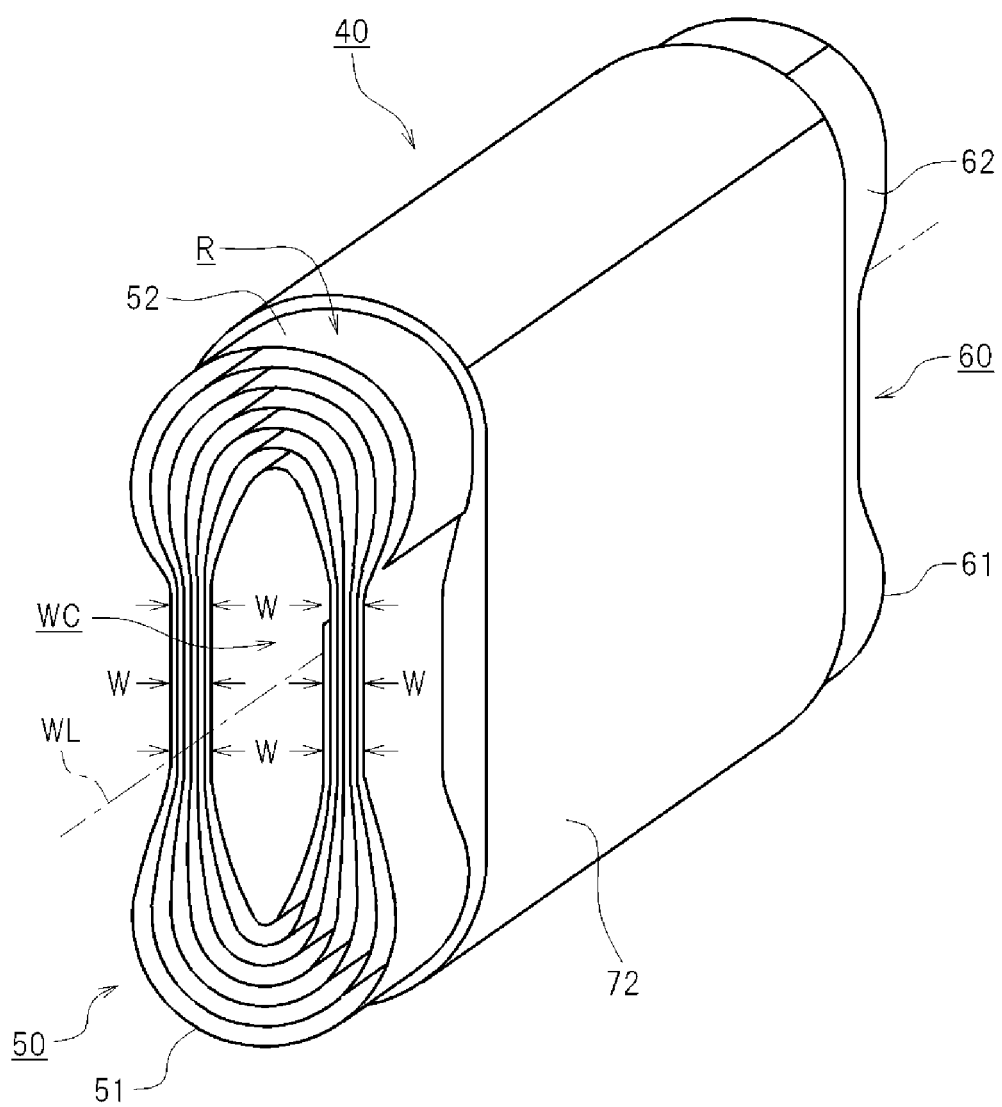
FIG. 3 is a perspective view illustrating an exposed portion 52 of a positive electrode current collector foil 51.

FIG. 3 is a perspective view illustrating the way in which the exposed portion 52 of the positive electrode current collector foil 51 is divided and gathered into two parts divided at the central portion WC containing the winding axis WL along the thickness direction of the flat wound electrode assembly 40. When each of the exposed portions 52 and 62 is divided at the central portion WC containing the winding axis WL, each of the exposed portions 52 and 62 can be divided uniformly, and moreover, the work of dividing each of them into two parts can be carried out easily. For this reason, it is reasonable to divide each of the exposed portions 52 and 62 at the central portion WC containing the winding axis WL. The edge portion 52 (exposed portion 52) of the positive electrode current collector foil 51 and the edge portion 62 (exposed portion 62) of the negative electrode current collector foil 61 are respectively gathered and welded to respective electrode terminals. The arrows W in FIG. 3 schematically indicate the positions to be welded. In this case, the welding may be carried out along a continuous linear line connecting the positions indicated by the arrows W. Alternatively, a plurality of positions along the linear line may be welded.

<High Temperature Aging>

In order to ensure safety, the lithium-ion secondary battery 10 may be subjected to predetermined high temperature aging before shipping. The high temperature aging before shipping is a test in which a lithium-ion secondary battery 10 is maintained at a predetermined state of charge (for example, at a SOC of about 90%) at a high temperature, at about 80° C., and set aside for a predetermined time (for example, for 20 hours or longer). Such high temperature aging is carried out in the inspecting process before shipping. The conditions of the high temperature aging are not limited to the above-described example.

In some cases, in the manufacturing process of the wound electrode assembly 40, metallic contaminants may enter the inside of the lithium-ion secondary battery 10. When metallic contaminants enter the wound electrode assembly 40, the metallic contaminants in the positive electrode active material layer 53 are dissolved (ionized) into the electrolyte solution and deposited on the negative electrode active material layer 63 side. In this case, if the metallic contaminants enter the inside of the lithium-ion secondary battery 10 in a large amount, the metallic contaminants deposited on the negative electrode active material layer 63 fill the pores in the separator and reach the positive electrode side, causing a micro-short circuit. By detecting such micro-short circuits, it is possible to detect the defective products containing metallic contaminants inside the lithium-ion secondary battery 10.

<Micro-Short Circuits at Winding Starting End Portion of Positive Electrode Sheet 50>

In the construction in which each of the exposed portions 52 and 62 is divided and gathered into two parts at the central portion WC containing the winding axis WL, the micro-short circuits between the positive electrode sheet 50 and the negative electrode sheet 60 are likely to be detected, for example, in high temperature aging before shipping. For this reason, the present inventors investigated the cause of the micro-short circuits during high temperature aging in such a construction.

Figure 4:
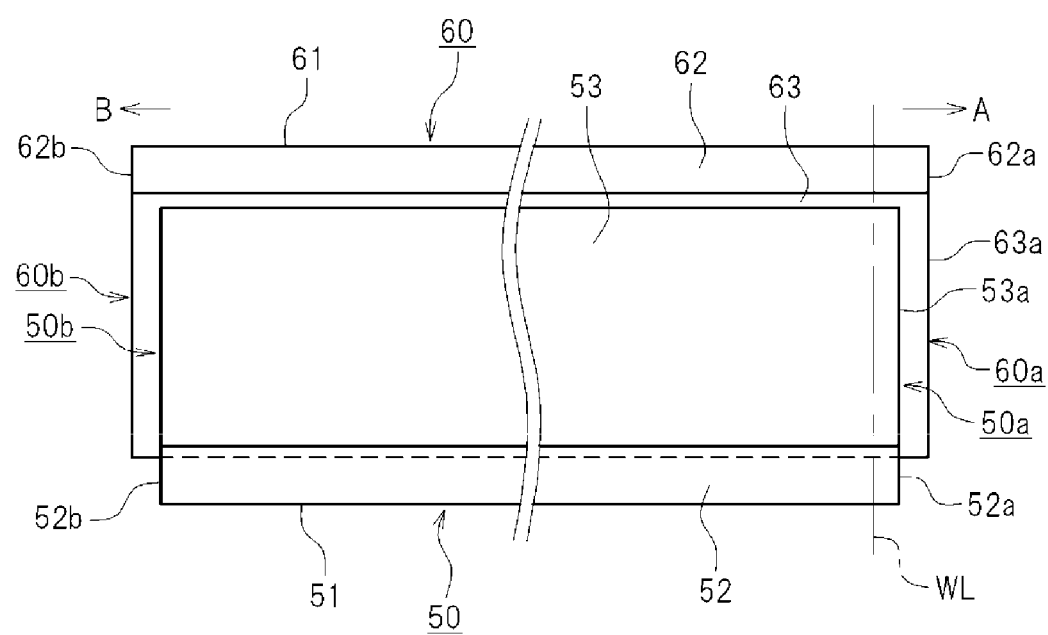
FIG. 4 is a schematic developed view illustrating the wound electrode assembly 40 developed.
Figure 5:
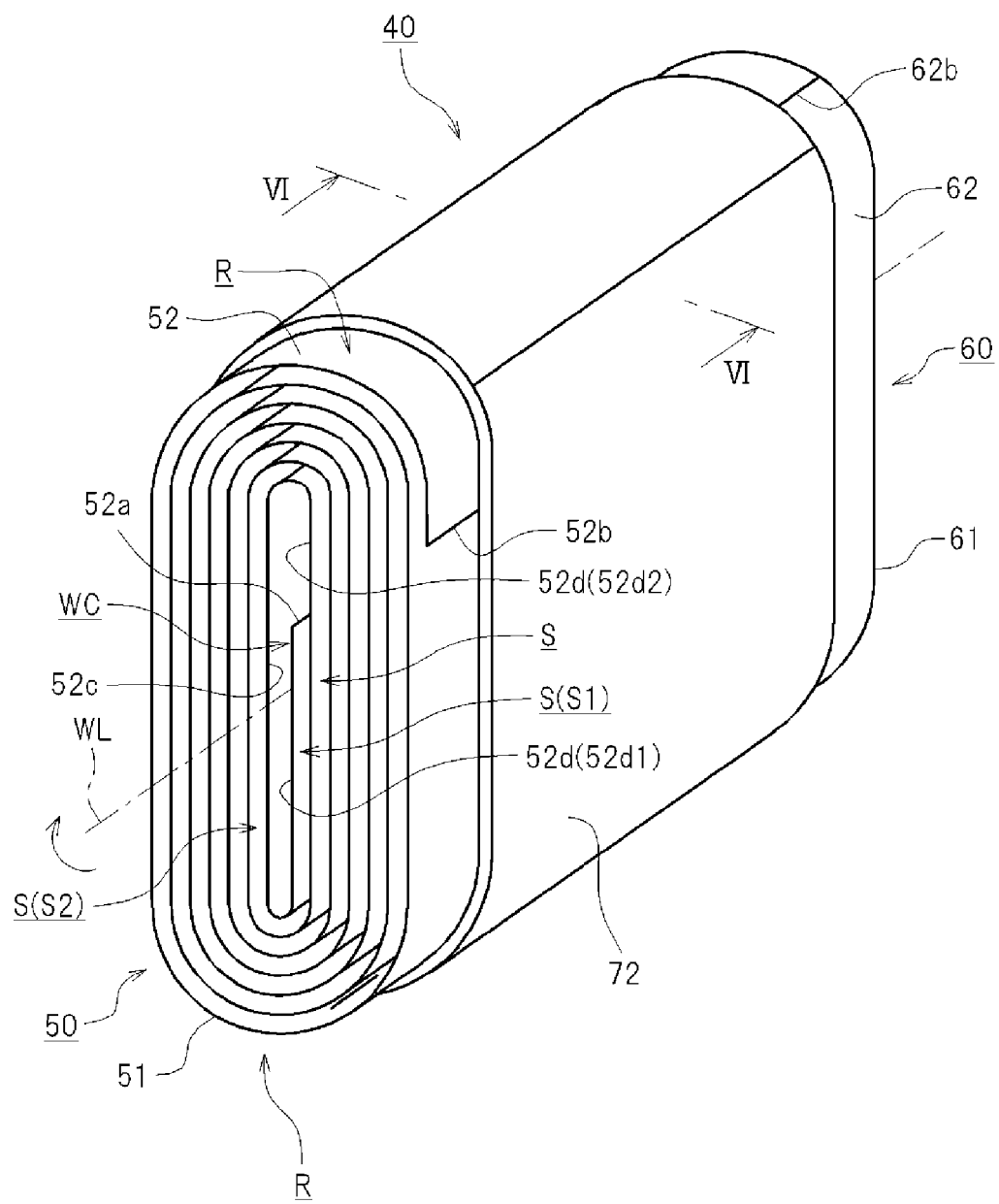
FIG. 5 is a perspective view schematically illustrating the flat-shaped wound electrode assembly 40 in which an exposed portion of a current collector foil is not yet gathered.
Figure 6:
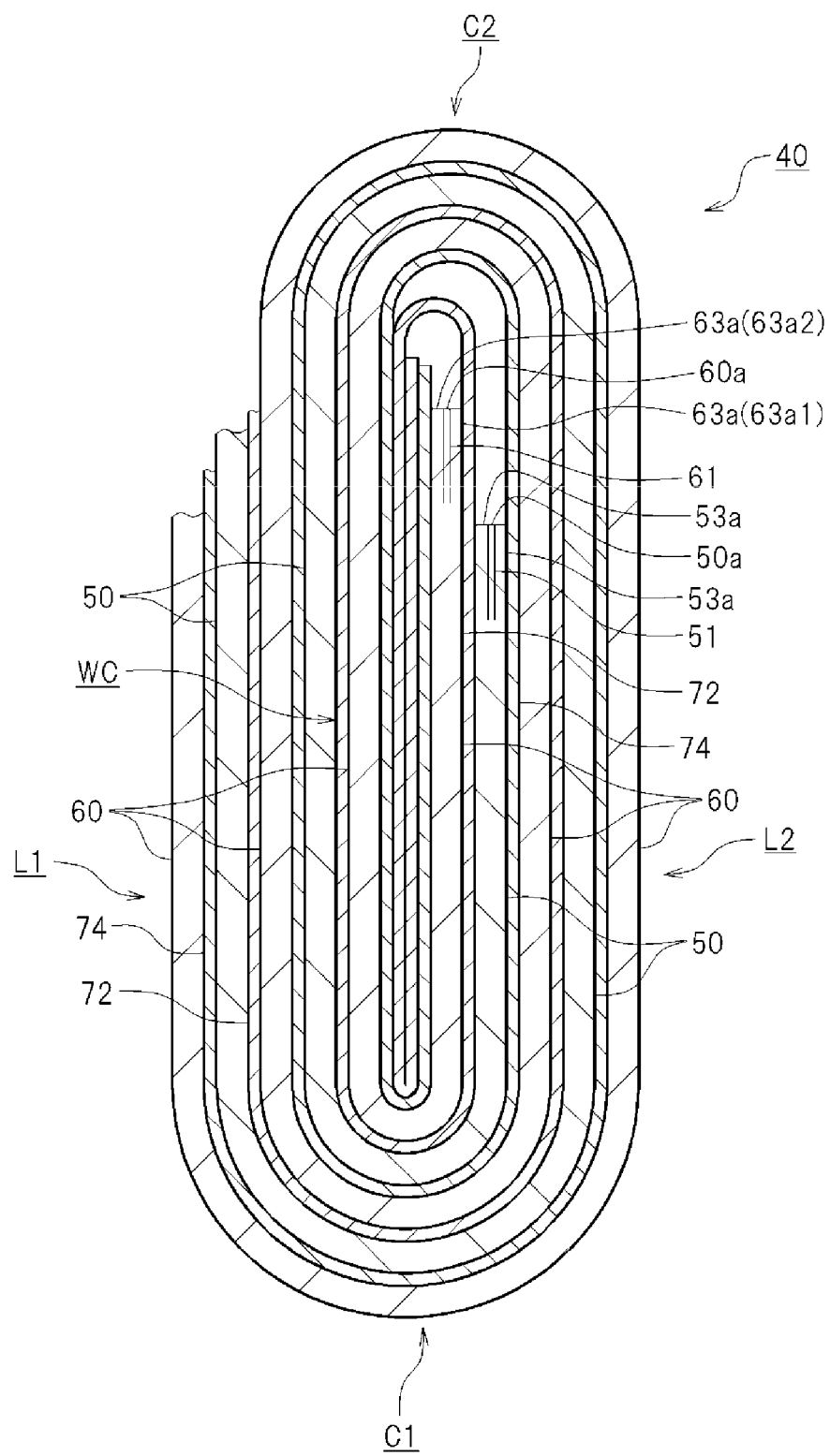
FIG. 6 is a cross-sectional view schematically illustrating a cross section of the wound electrode assembly 40 that is taken along its laterally middle portion.

FIG. 4 is a schematic developed view illustrating the wound electrode assembly 40 developed. In order to illustrate the arrangement of the positive electrode sheet and the negative electrode sheet 60 clearly, the separators 72 and 74 are not shown in the figure. FIG. 5 is a perspective view schematically illustrating the wound electrode assembly 40 in a flat shape in which the exposed portion 52 of the positive electrode current collector foil 51 is not yet gathered. FIG. 6 is a cross-sectional view schematically illustrating a cross section of the wound electrode assembly 40 that is taken along its laterally middle portion. In other words, FIG. 6 is an enlarged cross-sectional view of the middle portion of the wound electrode assembly 40 taken along line VI-VI in FIG. 5. Note that in FIG. 6, the positive electrode current collector foil 51 in the positive electrode sheet 50 and the negative electrode current collector foil 61 in the negative electrode sheet 60 are not shown for convenience of illustration, except for the respective winding starting end portions 51a and 61a. In FIG. 4, reference numeral 52b represents the winding terminal end portion of the edge portion 52 of the positive electrode current collector foil 51, and reference numeral 62 represents the winding terminal end portion of the edge portion 62 of the negative electrode current collector foil 61.

Here, as illustrated in FIG. 4, the negative electrode current collector foil 61 is longer than the positive electrode current collector foil 51 in the wound electrode assembly 40 (see FIGS. 1 and 2). The winding starting end portion 63a of the negative electrode active material layer 63 juts out from the winding starting end portion 53a of the positive electrode active material layer. In addition, as illustrated in FIG. 5, the edge portion 52 (exposed portion 52) of the positive electrode current collector foil 51 protrudes from the separators 72 and 74 in a spiral form. Although not shown in FIG. 5, the edge portion 62 (exposed portion 62) of the negative electrode current collector foil 61 also protrudes from the separators 72 and 74 in a spiral form in a similar manner to the positive electrode current collector foil 51, at the opposite end of the winding axis WL. As illustrated in FIG. 6, the separators 72 and 74 are overlapped with each other at the winding center WC. In the example shown in FIG. 6, the negative electrode sheet 60, the separator 74, the positive electrode sheet 50, and the separator 72 are overlapped with one another and wound around the separators 72 and 74 at the winding center WC.

In the construction shown in FIG. 3, the exposed portion 52 of the positive electrode current collector foil 51 of the wound electrode assembly 40 is divided and gathered into two parts at the central portion WC containing the winding axis WL along the thickness direction of the wound electrode assembly 40 in a flat shape. Although not shown in the drawings, the exposed portion 62 of the negative electrode current collector foil 61 is divided and gathered into two parts at the central portion WC containing the winding axis WL along the thickness direction of the wound electrode assembly 40 in a flat shape, in a similar manner to the exposed portion 52 of the positive electrode current collector foil 51.

The micro-short circuits that occurred in high temperature aging in such a configuration were investigated. Consequently, it was found that there were some cases where micro-short circuits occurred at the winding starting end portion 50a (i.e., the starting end of winding) of the positive electrode sheet 50 and in the adjacent region thereof. In addition, there were some cases where, in the just-mentioned regions, the positive electrode active material (specifically, the transition metal contained in the positive electrode active material) was excessively dissolved away from the positive electrode active material layer 53, although it did not lead to micro-short circuits. In the cases where micro-short circuits occurred in the just-mentioned regions, the dissolved transition metal was deposited on the portion of the negative electrode active material layer 63 that faces the portion of the positive electrode active material layer 53 in the winding starting end portion 50a. The deposited substance filled the pores in the separators 72 and 74 in that region, causing a micro-short circuit.

As described above, the micro-short circuits that occur at the winding starting end portion 50a of the positive electrode sheet 50 may not result from the contamination by metallic contaminants. Such micro-short circuits resulting from the dissolution of the positive electrode active material at the winding starting end portion 50a of the positive electrode sheet 50 need to be avoided as far as possible. According to the knowledge of the present inventors, almost no phenomenon of dissolution of the positive electrode active material at the winding starting end portion 50a of the positive electrode sheet 50 occurs in the design of gathering each of the exposed portions 52 and 62 of the positive and negative electrode sheets 50 and 60 into one piece in the thickness direction. In other words, the phenomenon of dissolution of the positive electrode active material at the winding starting end portion 50a of the positive electrode sheet 50 is a phenomenon that is likely to occur particularly in the design in which each of the exposed portions 52 and 62 of the positive and negative electrode sheets 50 and 60 is divided into two parts at the central portion WC containing the winding axis WL and each of the divided parts is gathered in the thickness direction.

The present inventors believe that the reason why such a phenomenon of dissolution is apt to occur in the design in which each of the exposed portions 52 and 62 of the positive and negative electrode sheets 50 and 60 is divided into two parts at the central portion WC containing the winding axis WL and each of the divided parts is gathered in the thickness direction is as follows.

In the inside of the winding, the winding starting end portion 50a of the positive electrode sheet 50 is opposed to the winding starting end portion 60a of the negative electrode sheet 60 across the separator 72 or the separator 74. When the wound electrode assembly 40 is developed, the winding starting end portion 60a of the negative electrode sheet 60 extends beyond the starting end of winding of the positive electrode sheet 50 toward the inside A of winding (in the direction indicated by the arrow A in FIG. 4). In other words, the winding starting end portion 60a of the negative electrode sheet 60 juts out from the winding starting end portion 50a of the positive electrode sheet 50. In the region in which the positive electrode sheet 50 juts out from the negative electrode sheet 60, the negative electrode active material layer 63 is not opposed to the positive electrode active material layer 53. In addition, the negative electrode active material layer 63 is provided on both faces of the negative electrode sheet 60. Although the central portion WC of the wound electrode assembly 40 containing the winding axis WL of the wound electrode assembly 40 (i.e., the gap in the central portion of the wound electrode assembly 40) is covered by the separators 72 and 74, the negative electrode active material layer 63 exists outside of the separators 72 and 74.

This means that, during charge, the Li (lithium ions) released from the positive electrode active material layer 53 at the winding starting end portion 50a of the positive electrode sheet 50 is absorbed into the opposed negative electrode active material layer 63 via the separators 72 and 74. The winding starting end portion 60a of the negative electrode sheet 60 juts out from the winding starting end portion 50a of the positive electrode sheet 50. The amount of the negative electrode active material that absorbs the Li released from the positive electrode active material layer 53 is greater relative to the amount of the positive electrode active material contained in the positive electrode active material layer 53 at the winding starting end portion 50a of the positive electrode sheet 50.

Moreover, the negative electrode active material layer 63a1 that is on the side opposed to the positive electrode sheet 50 at the winding starting end portion 50a (see FIG. 6: the negative electrode active material layer 63 on the outer side of the winding at the winding starting end portion) is not the only negative electrode active material layer that accepts the Li ions released from the positive electrode active material layer 53 at the winding starting end portion 50a of the positive electrode sheet 50. According to the knowledge of the present inventors, the Li ions go around to the opposite face of the winding starting end portion 60a of the negative electrode sheet 60 (the face that is not opposed to the winding starting end portion 50a of the positive electrode sheet 50), so the Li ions can be also absorbed by the negative electrode active material layer 63a2 retained on the opposite side face (see FIG. 6: the negative electrode active material layer 63 on the central portion WC side at the winding starting end portion) Thus, the negative electrode active material layer 63 that accepts the Li released during charge is significantly greater for the region of the positive electrode active material layer 53 at the winding starting end portion 50a than for the other region of the positive electrode active material layer 53.

In addition, according to the knowledge of the present inventors, the tendency of excessive Li-ion diffusion is particularly significant in the region where the negative electrode active material layer 63 is in contact with the air (specifically oxygen) contained in the battery case 20 (see FIG. 1). For example, lithium ions may react with oxygen in the air and form lithium oxide in the region where the negative electrode active material layer 63 is in contact with the air (specifically oxygen) contained in the battery case 20 (see FIG. 1). When lithium ions are consumed by such a reaction, lithium ions are further diffused into the above-mentioned region.

When each of the exposed portions 52 and 62 of the positive and negative electrode sheets 50 and 60 is divided into two parts at the central portion WC containing the winding axis WL and each of the divided parts is gathered in the thickness direction, the central portion WC is opened. When the central portion WC is opened, the negative electrode active material layer 63a2 (see FIG. 6) on the central portion WC side easily comes into contact with the air (oxygen) within the battery case 20. As a consequence, a large amount of Li diffuses into the negative electrode active material layer 63a2 on the central portion WC side.

In this case, for example, in high temperature aging, an excessively large amount of Li ions are released from the positive electrode active material layer 53 at the winding starting end portion 50a of the positive electrode sheet 50, and the potential rises locally. Moreover, since the winding starting end portion 63a of the negative electrode active material layer 63 is in contact with oxygen, lithium ions are further diffused. Lithium ions are excessively released at the winding starting end portion 53a of the positive electrode active material layer 53, and the potential of the winding starting end portion 53a is further increased. As a consequence, when the potential rises to the level at which the transition metal of the positive electrode active material dissolves away, the metal element dissolves locally in that region from the transition metal of the positive electrode active material. As a consequence, the metal element dissolved from the transition metal of the positive electrode active material in the positive electrode active material layer 53 deposits on the opposed negative electrode active material layer 63, causing a micro-short circuit.

<Design in which Exposed Portion is Gathered into One Piece>

As already described above, almost no phenomenon of dissolution of the positive electrode active material at the winding starting end portion 50a of the positive electrode sheet 50 occurs in the design in which each of the exposed portions 52 and 62 of the positive and negative electrode sheets 50 and 60 is gathered into one piece in the thickness direction. The present inventors observe this point as follows. In the design in which each of the exposed portions 52 and 62 of the positive and negative electrode sheets 50 and 60 is gathered into one piece in the thickness direction, the central portion WC is in a closed state. In this case, various kinds of sheets are densely overlapped with each other in the central portion WC. In the narrow gaps therebetween, capillary action takes effect, causing the electrolyte solution 80 (see FIG. 1) to permeate therethrough sufficiently. As a result, the electrolyte solution is sufficiently impregnated in the winding starting end portion 63a of the negative electrode active material layer 63 and in the adjacent region thereof.

The present inventors believe that the reason why almost no phenomenon of dissolution of the positive electrode active material at the winding starting end portion 50a of the positive electrode sheet 50 occurs in the design in which each of the exposed portion is gathered into one piece is as follows. According to the knowledge of the present inventors, excessive Li diffusion is unlikely to occur in the region where the negative electrode active material layer 63 is not in contact with the air (specifically oxygen) contained in the battery case 20 (see FIG. 1). In the design of gathering each of the exposed portions 52 and 62 of the positive and negative electrode sheets 50 and 60 into one piece in the thickness direction, the electrolyte solution 80 is impregnated sufficiently in the winding starting end portions 63a1 and 63a2 (see FIG. 6) of the negative electrode active material layer 63 and in the adjacent region thereof. Therefore, excessive Li-ion diffusion is unlikely to occur in the winding starting end portions 63a1 and 63a2 and in the adjacent region thereof. Accordingly, the micro-short circuits resulting from the dissolution of the positive electrode active material at the winding starting end portion 50a of the positive electrode sheet 50 is unlikely to occur.

Nevertheless, there are some cases in which the design of gathering each of the exposed portions 52 and 62 of the positive and negative electrode sheets 50 and 60 into one piece in the thickness direction cannot be applied, as already discussed previously.

<Proposed Novel Structure>

Figure 7:
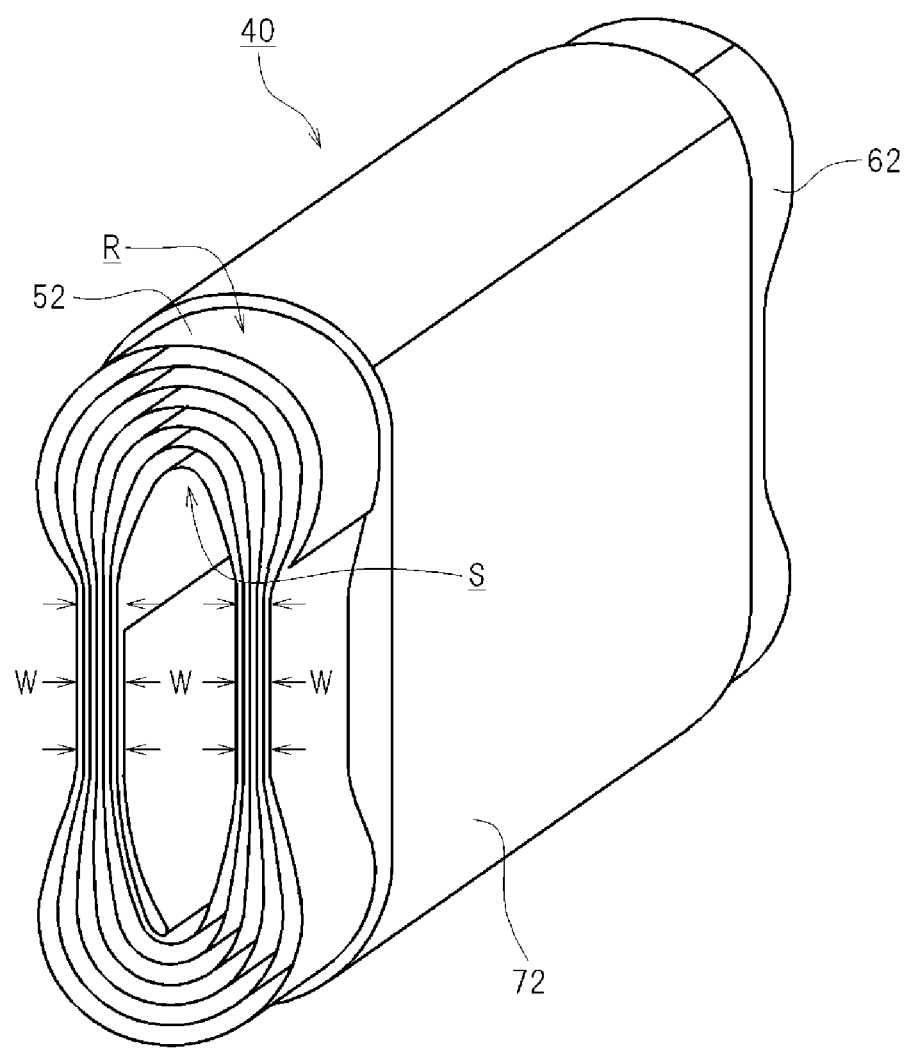
FIG. 7 is a perspective view illustrating the wound electrode assembly 40.

In view of the foregoing circumstances, the present inventors propose a novel structure of lithium-ion secondary battery 10 (see, for example, FIG. 1). FIG. 7 is a perspective view schematically illustrating a lithium-ion secondary battery proposed herein in which the exposed portion 52 of the positive electrode current collector foil 51 is gathered.

As illustrated in FIG. 1, the lithium-ion secondary battery 10 proposed herein comprises a battery case 20, a wound electrode assembly 40 enclosed in the battery case 20, and an electrolyte solution 80 enclosed in the battery case 20. The wound electrode assembly 40 includes a positive electrode current collector foil 51 and a negative electrode current collector foil 61. An edge portion 52 (exposed portion 52 in the example shown in FIG. 1) of the positive electrode current collector foil 51 is exposed in a spiral form at one end of a winding axis WL (see FIG. 5). An edge portion 62 (exposed portion 62 in the example shown in FIG. 1) of the negative electrode current collector foil 61 is exposed in a spiral form at the other end of the winding axis WL (see FIG. 5). Furthermore, as illustrated in FIG. 7, the spirally exposed edge portion 52 of the positive electrode current collector foil 51 is divided and gathered into a plurality of parts at at least one of a plurality of gaps S, excluding a central portion WC containing the winding axis WL, provided between wound layers of the positive electrode current collector foil 51 staked in a direction orthogonal to the winding axis WL. Likewise, the spirally exposed edge portion 62 of the negative electrode current collector foil 61 is divided and gathered into a plurality of parts at at least one of a plurality of gaps S, excluding the central portion WC containing the winding axis WL, provided between wound layers of the negative electrode current collector foil 61 staked in a direction orthogonal to the winding axis WL. FIG. 7 shows an embodiment in which each of the edge portions 52 and 62 of the positive and negative electrode current collector foils 51 and 61 of the wound electrode assembly 40 is divided at a later-described gap S1 shown in FIGS. 8 and 9 and each of the divided parts is gathered. The gathered parts of the edge portion 52 of the positive electrode current collector foil 51 and the edge portion 62 of the negative electrode current collector foil 61 are welded to respective electrode terminals. The arrows W in FIG. 7 schematically indicate the positions to be welded, as in FIG. 3.

According to the discovery of the present inventors, with this embodiment, no micro-short circuit resulting from the dissolution of the positive electrode active material at the winding starting end portion 50a of the positive electrode sheet 50 was detected in high temperature aging. The present inventors interprets the result as follows. The central portions WC of the edge portions 52 and 62 of the positive and negative electrode current collector foils 51 and 61 that jut out from the separators 72 and 74 are closed. Accordingly, the gap around the winding starting end portion 63a (see FIG. 6) of the negative electrode active material layer 63 is narrowed.

As a result, the amount of air (oxygen) is small around the winding starting end portion 63a (see FIG. 6) of the negative electrode active material layer 63. Moreover, the electrolyte solution 80 is impregnated sufficiently by capillary action into the winding starting end portions 63a1 and 63a2 of the negative electrode active material layers 63 that are on both faces of the negative electrode sheet 60. As a result, almost no air (oxygen) comes into contact with the winding starting end portions 63a1 and 63a2 (see FIG. 6) of the negative electrode active material layers 63. Therefore, excessive Li-ion diffusion does not occur easily in the winding starting end portions 63a1 and 63a2 and in the adjacent region thereof. Accordingly, the micro-short circuits resulting from the dissolution of the positive electrode active material at the winding starting end portion 50a of the positive electrode sheet 50 hardly occur in the high temperature aging before shipping.

This construction makes it possible to divide the edge portions 52 and 62 of the positive and negative electrode current collector foils 51 and 61 that jut out from the separators 72 and 74 into two or more parts and to gather each of the divided parts. Therefore, the structure of the lithium-ion secondary battery 10 proposed herein can be applied to a wound electrode assembly 40 having a large number of winding turns.

Thus, the lithium-ion secondary battery 10 proposed herein can also be applied to a large-sized lithium-ion secondary battery 10 having a large number of winding turns. Furthermore, the micro-short circuits resulting from the dissolution of the positive electrode active material at the winding starting end portion 50a of the positive electrode sheet 50 hardly occur in the high temperature aging before shipping. As a result, it becomes possible to prevent the decrease in production yield resulting from the micro-short circuits detected in the high temperature aging before shipping. In the following, examples of the structure of the lithium-ion secondary battery 10 proposed herein will be described in more detail.

As a preferred embodiment that can obtain the above-described advantageous effects, it is desirable that, within the spirally exposed edge portion 52 of the positive electrode current collector foil 51, two edge parts 52c and 52d that are positioned respectively on opposite sides of the central portion WC along a direction orthogonal to the winding axis WL should be gathered into one piece, as illustrated in FIG. 5. For example, as illustrated in FIG. 5, the two edge parts 52c and 52d that are positioned on opposite sides of the central portion WC contain the winding starting end portion 51a of the positive electrode current collector foil 51. In this case, it is desirable that the two edge parts 52c and 52d positioned on opposite sides of the central portion WC be gathered, irrespective of the position of the winding starting end portion 51a of the positive electrode current collector foil 51 with respect to the winding direction. For example, when the wound electrode assembly 40 is in a flat shape along one plane containing the winding axis WL, it is desirable that the edge parts 52c and 52d on opposite sides that are opposed across the central portion WC along the one plane containing the winding axis WL should be gathered. In this case, the winding starting end portion 52a of the edge portion 52 of the positive electrode current collector foil 51 may be contained in either of the edge parts 52c and 52d on opposite sides that are opposed to each other across the central portion WC, although it may depend on the position of the winding starting end portion 52a of the edge portion 52 of the positive electrode current collector foil 51. In this case, it is desirable that the winding starting end portion 52a of the edge portion 52 of the positive electrode current collector foil 51 be contained in the gathered part of the edge parts 52c and 52d (52d1, 52d2) on opposite sides that are opposed across the central portion WC.

In another preferred embodiment, it is possible that, for example, at least a portion of the spirally exposed edge portion 52 of the positive electrode current collector foil 51 that extends from the winding starting end thereof to the first turn thereof may be gathered into one piece. In this case, it is desirable that the number of turns from the winding starting end be determined with respect to the winding direction based on the winding starting end portion 52a (the edge portion that is inward with respect to the winding direction) of the spirally exposed edge portion 52 of the positive electrode current collector foil 51, as illustrated in FIG. 5. In this case, it is desirable that the number of turns from the winding starting end (i.e., the number of winding turns) be set so that the first turn from the winding starting end is defined as the location at which the positive electrode current collector foil 51 is wound one time in the winding direction with reference to the winding starting end portion 51*a* of the positive electrode current collector foil 51. Note that the number of winding turns of the edge portion 62 of the negative electrode current collector foil 61 can be defined in like manner.

In another preferred embodiment, it is possible that, for example, the winding starting end portion 52*a* (see FIG. 5) of the spirally exposed edge portion 52 of the positive electrode current collector foil 51 may be disposed inside one of the gathered parts of the positive electrode current collector foil 51. That is, it is desirable that the winding starting end portion 52*a* of the edge portion 52 of the positive electrode current collector foil 51 be gathered so that the winding starting end portion 52*a* is wrapped inside the gathered part of the positive electrode current collector foil 51. In this case, the gap space around the winding starting end portion 63*a* (see FIG. 6) of the negative electrode active material layer 63 can be narrowed more reliably. So, the winding starting end portions 63*a*1 and 63*a*2 of the negative electrode active material layers 63 are prevented from making contact with the air (oxygen). As a result, the micro-short circuit resulting from the dissolution of the positive electrode active material from the winding starting end portion 50*a* of the positive electrode sheet 50 can be inhibited more reliably in high temperature aging before shipping.

In another preferred embodiment, it is possible that, for example, at least a portion of the spirally exposed edge portion 52 of the positive electrode current collector foil 51 that extends from the winding starting end thereof to the second turn thereof may be gathered into one piece. Here, it is desirable to define the second turn from the winding starting end as the location at which the positive electrode current collector foil 51 is turned two times in the winding direction with reference to the winding starting end portion 51*a* of the positive electrode current collector foil 51. In this case, the micro-short circuit resulting from the dissolution of the positive electrode active material from the winding starting end portion 50*a* of the positive electrode sheet 50 can be inhibited more reliably in high temperature aging before shipping. In the central portion WC of the wound electrode assembly 40, the separators 72 and 74 are interposed in an overlapped condition.

In addition, in the embodiment in which a portion of the edge portion that extends from the winding starting end to the second turn is gathered into one piece, the central portion WC of the wound electrode assembly 40 is closed by portions of the sheets that extend from the winding starting end to the second turn. Therefore, the central portion WC of the wound electrode assembly 40 is closed by more layers of the sheets than in the embodiment in which a portion of the edge portion is gathered into one piece up to the first turn. In other words, the number of winding turns of the positive electrode sheet 50, the negative electrode sheet 60, and the separators 72 and 74 that close the central portion WC of the wound electrode assembly 40 is greater. Thus, the embodiment in which at least a portion of the edge portion that extends from at least the winding starting end thereof to the second turn thereof is gathered into one piece can easily obtain a required strength for the sheets that close the central portion WC of the wound electrode assembly 40. In addition, this makes it possible to gather the winding starting end portion 52*a* of the edge portion 52 of the positive electrode current collector foil 51 reliably, for example, even when the winding starting end portion 52*a* is at a position close to a curved portion (R) of the wound electrode assembly 40 in a flat shape.

It is also desirable, for example, that the spirally exposed edge portion 52 of the positive electrode current collector foil 51 be divided at one of a plurality of gaps S provided in a direction orthogonal to the winding axis WL that is selected from first to fourth gaps from the central portion WC containing the winding axis WL. In this case, the edge portion 52 of the positive electrode current collector foil 51 in the wound electrode assembly is divided at the gap near the central portion WC. In other words, even when the spirally exposed edge portion 52 of the positive electrode current collector foil 51 is gathered into two parts in the wound electrode assembly 40, the edge portion 52 of the positive electrode current collector foil 51 can be divided substantially uniformly in a well-balanced manner.

Hereinabove, preferred embodiments have been illustrated of the spirally exposed edge portion 52 of the positive electrode current collector foil 51 of the lithium-ion secondary battery 10. It is desirable that the spirally exposed edge portion 62 of the negative electrode current collector foil 61 of the lithium-ion secondary battery 10 be also gathered in a similar manner to the edge portion 52 of the positive electrode current collector foil 51. It should be noted that, for the lithium-ion secondary battery 10 proposed herein, the structure in which the edge portion 62 of the wound negative electrode current collector foil 61 is gathered is not shown in the drawings. However, in the lithium-ion secondary battery 10 proposed herein, the structure in which the edge portion 62 of the wound negative electrode current collector foil 61 is gathered is substantially the same as the structure of the edge portion 52 of the positive electrode current collector foil 51 shown in FIG. 7. Also, reference may be made to FIGS. 4, 5, and 6, as appropriate.

The drawings do not show the two edge parts of the edge portion 62 of the negative electrode current collector foil 61 that are positioned respectively on opposite sides of the central portion WC along a direction orthogonal to the winding axis WL. For understanding them, it is recommended to refer to the edge parts 52*c* and 52*d* of the positive electrode current collector foil 51 in FIG. 5 as appropriate. The drawings do not show the winding starting end portion 61*a* of the negative electrode current collector foil 61 in the wound condition. For understanding it, it is recommended to refer to the winding starting end portion 51*a* of the positive electrode current collector foil 51 shown in FIG. 5 as appropriate. Moreover, it is recommended to refer to the gap S of the positive electrode current collector foil 51 shown in FIG. 5 as appropriate, for a plurality of gaps S provided between the wound layers of the spirally exposed edge portion 62 of the negative electrode current collector foil 61 stacked in a direction orthogonal to the winding axis WL.

In another preferred embodiment, it is possible that at least a portion of the spirally exposed edge portion 62 of the negative electrode current collector foil 61 that extends from the winding starting end thereof to the first turn thereof may be gathered into one piece. It is also possible that the winding starting end portion 62*a* (see FIG. 4) of the spirally exposed edge portion 62 of the negative electrode current collector foil 61 may be disposed inside one of the gathered parts of the negative electrode current collector foil 61. It is also possible that at least a portion of the spirally exposed edge portion 62 of the negative electrode current collector foil 61 that extends from the winding starting end thereof to the first turn thereof may be gathered into one piece. It is also possible that the spirally exposed edge portion 62 of the negative electrode current collector foil 61 may be divided at one of a plurality of gaps S (see the gap S of the positive electrode current collector foil 51 shown in FIG. 5) provided in a direction orthogonal to the winding axis WL, the one of the plurality of gaps being selected from first to fourth gaps from the central portion containing the winding axis. Furthermore, as for the structure of gathering the edge portion 52 of the positive electrode current collector foil 51 and the structure of gathering the edge portion 62 of the negative electrode current collector foil 61, the structures shown above as examples may be combined with one another appropriately.

In the following, examples of the structure of the wound electrode assembly 40 in the lithium-ion secondary battery 10 proposed herein will be described.

In the lithium-ion secondary battery 10 proposed herein, it is desirable that, as illustrated in FIG. 2, for example, the wound electrode assembly 40 have a positive electrode active material layer 53 retained on a strip-shaped positive electrode current collector foil 51, and a negative electrode active material layer 63 retained on a strip-shaped negative electrode current collector foil 61. The strip-shaped positive electrode current collector foil 51 and the strip-shaped negative electrode current collector foil 61 may be oriented in a common longitudinal direction and stacked together with the separators 72 and 74 interposed between the positive electrode active material layer 53 and the negative electrode active material layer 63. The strip-shaped positive electrode current collector foil 51 and the strip-shaped negative electrode current collector foil 61 may be wound around the winding axis WL set along a width direction of the strip-shaped positive electrode current collector foil. Here, as illustrated in FIG. 6, in the central portion WC containing the winding axis WL, the negative electrode active material layer 63 may be disposed closer to the winding axis than the positive electrode active material layer 53. Furthermore, the winding starting end portion 63a of the negative electrode active material layer 63 may jut out from the winding starting end portion 53a of the positive electrode active material layer 53 in the winding direction around the winding axis WL.

In the lithium-ion secondary battery 10 proposed herein, it is desirable that the edge portion 52 of the positive electrode current collector foil 51 and the edge portion 52 of the negative electrode current collector foil 61 be gathered as in any one of the embodiments described above. For example, it is desirable that the spirally exposed edge portion 52 of the positive electrode current collector foil 51 be divided gathered into a plurality of parts at at least one of a plurality of gaps S, excluding the central portion WC containing the winding axis WL, provided between wound layers of the positive electrode current collector foil 51 stacked in a direction orthogonal to the winding axis WL. Likewise, it is desirable that the spirally exposed edge portion 62 of the negative electrode current collector foil 61 be divided and gathered into a plurality of parts at at least one of a plurality of gaps S, excluding the central portion WC containing the winding axis WL, provided between wound layers of the negative electrode current collector foil 61 stacked in a direction orthogonal to the winding axis WL.

This allows the electrolyte solution 80 (see FIG. 1) to be impregnated sufficiently especially in the gaps at the winding starting end portion 53a (see FIG. 4) of the positive electrode active material layer 53 and in the adjacent region thereof, and in the gaps at the winding starting end portion 63a (see FIG. 4) of the negative electrode active material layer 63 and in the adjacent region thereof, in the wound electrode assembly 40. Thus, in the winding starting end portion 63a of the negative electrode active material layer 63 and the adjacent region thereof, the electrolyte solution is sufficiently impregnated, so the negative electrode active material layer 63 does not easily come into contact with the air (oxygen) within the battery case 20, and Li-ions are unlikely to diffuse excessively. The micro-short circuits resulting from the dissolution of the positive electrode active material is unlikely to occur at the winding starting end portion 50a of the positive electrode sheet 53 and in the adjacent region thereof.

In addition, the battery case 20 may be a prismatic case having an accommodating space in a flat parallelepiped shape, as illustrated in FIG. 1. In this case, it is desirable that the wound electrode assembly 40 be enclosed in the battery case 20 in a flat condition along a plane containing the winding axis WL. Each of the gathered part of the positive electrode current collector foil 51 and the gathered part of the negative electrode current collector foil 61 may be gathered into a linear line shape along the just-mentioned plane (i.e., one plane containing the winding axis WL that corresponds to the flat condition of the wound electrode assembly 40).

In addition, as illustrated in FIG. 1, the lithium-ion secondary battery 10 may further include a positive electrode terminal 23 attached to the battery case 20, and a negative electrode terminal 24 attached to the battery case 20. In this case, the positive electrode terminal 23 may include a retaining portion 23a retaining at least two gathered parts of the positive electrode current collector foil 51. The negative electrode terminal 24 may include a retaining portion 24a retaining at least two gathered parts of the negative electrode current collector foil 61.

Next, it is desirable that a method of manufacturing a lithium-ion secondary battery 10 proposed herein include the steps of: preparing a wound electrode assembly 40; attaching a positive electrode terminal 23 to the wound electrode assembly 40; and attaching a negative electrode terminal 24 to the wound electrode assembly 40. Here, the prepared wound electrode assembly 40 may include a positive electrode current collector foil 51 having an edge portion 52 exposed in a spiral form at one end of a winding axis WL, and a negative electrode current collector foil 61 having an edge portion 62 exposed in a spiral form at the other end of the winding axis WL.

In the step of attaching the positive electrode terminal 23 to the wound electrode assembly 40, first, the spirally exposed edge portion 52 of the positive electrode current collector foil 51 is divided and gathered into a plurality of parts at at least one of a plurality of gaps S, excluding the central portion WC containing the winding axis WL, provided between wound layers of the positive electrode current collector foil 51 staked in a direction orthogonal to the winding axis WL. Then, the positive electrode terminal 23 is attached to the gathered edge portion 52. In the step of attaching the negative electrode terminal 24 to the wound electrode assembly 40, the spirally exposed edge portion 62 of the negative electrode current collector foil 61 is divided and gathered into a plurality of parts at at least one of a plurality of gaps S, excluding the central portion WC containing the winding axis WL, provided between layers of the negative electrode current collector foil 61 in a direction orthogonal to the winding axis WL. Then, the negative electrode terminal 24 is attached to the gathered edge portion 62. Thereby, the lithium-ion secondary battery 10 proposed herein can be embodied. In this case, the step of attaching the positive electrode terminal 23 to the wound electrode assembly 40 and the step of attaching the negative electrode terminal 24 to the wound electrode assembly 40 may be carried out in any order, or may be carried out at the same time.

In this case, in the step of attaching the positive electrode terminal 23 to the wound electrode assembly 40, for example, two edge parts 52c and 52d within the spirally exposed edge portion 52 of the positive electrode current collector foil 51 may be gathered into one piece, the two edge parts 52c and 52d being positioned respectively on opposite sides of the central portion WC along a direction orthogonal to the winding axis WL. In another preferred embodiment, it is possible that at least a portion of the spirally exposed edge portion 52 of the positive electrode current collector foil 51 that extends from the winding starting end thereof to the first turn thereof may be gathered into one piece, and the positive electrode terminal 23 may be attached to the edge portion 52 of the positive electrode current collector foil 51. In another preferred embodiment, it is possible that the winding starting end portion 52a of the spirally exposed edge portion 52 of the positive electrode current collector foil 51 may be disposed inside one of the gathered parts of the positive electrode current collector foil 51, and the positive electrode terminal 23 may be attached to the edge portion 52 of the positive electrode current collector foil 51. In still another preferred embodiment, it is possible that a portion of the spirally exposed edge portion 52 of the positive electrode current collector foil 51 that extends from the winding starting end thereof to the second turn thereof may be gathered into one piece, and the positive electrode terminal 23 may be attached to the edge portion 52 of the positive electrode current collector foil 51.

By such manufacturing steps, the gap around the winding starting end portion 63a (see FIG. 6) of the negative electrode active material layer 63 can be narrowed more reliably. So, the winding starting end portions 63a1 and 63a2 of the negative electrode active material layers 63 are prevented from making contact with the air (oxygen). As a result, the micro-short circuit resulting from the dissolution of the positive electrode active material from the winding starting end portion 50a of the positive electrode sheet 50 can be inhibited in high temperature aging before shipping.

It is also desirable, for example, that the spirally exposed edge portion 52 of the positive electrode current collector foil 51 be divided at one of a plurality of gaps S provided in a direction orthogonal to the winding axis WL that is selected from first to fourth gaps from the central portion containing the winding axis WL. In this case, in the wound electrode assembly 40, the edge portion 52 of the positive electrode current collector foil 51 is divided at a gap near the central portion WC. In other words, when the spirally exposed edge portion 52 of the positive electrode current collector foil 51 is gathered into two parts in the wound electrode assembly 40, the edge portion 52 can be divided substantially uniformly in a well-balanced manner.

It is also desirable that in the step of attaching the negative electrode terminal 24 to the wound electrode assembly 40, for example, two edge parts within the spirally exposed edge portion 62 of the negative electrode current collector foil 61 be gathered into one piece, the two edge parts being positioned respectively on opposite sides of the central portion WC along a direction orthogonal to the winding axis WL. Then, it is desirable that the negative electrode terminal 24 be attached to the gathered edge portion 62. It is also possible that in the just-mentioned step, at least a portion of the spirally exposed edge portion 62 of the negative electrode current collector foil 61 that extends from the winding starting end thereof to the first turn thereof may be gathered into one piece. In another preferred embodiment, it is possible that the winding starting end portion 62a of the spirally exposed edge portion 62 of the negative electrode current collector foil 61 may be disposed inside one of the gathered parts of the negative electrode current collector foil 61, and the negative electrode terminal 24 may be attached to the negative electrode current collector foil 61. In still another preferred embodiment, it is possible that at least a portion of the spirally exposed edge portion 62 of the negative electrode current collector foil 61 that extends from the winding starting end thereof to the second turn thereof may be gathered into one piece, and the negative electrode terminal 24 may be attached to the negative electrode current collector foil 61.

By such manufacturing steps, the gap around the winding starting end portion 63a (see FIG. 6) of the negative electrode active material layer 63 can be narrowed more reliably. So, the winding starting end portions 63a1 and 63a2 of the negative electrode active material layers 63 are prevented from making contact with the air (oxygen). As a result, the micro-short circuit resulting from the dissolution of the positive electrode active material from the winding starting end portion 50a of the positive electrode sheet 50 can be inhibited in high temperature aging before shipping.

It is also desirable that the spirally exposed edge portion 62 of the negative electrode current collector foil 61 be divided at one of a plurality of gaps S provided in a direction orthogonal to the winding axis WL that is selected from first to fourth gaps from the central portion WC containing the winding axis WL. In this case, the edge portion 52 of the positive electrode current collector foil 51 is divided at a gap near the central portion WC. In other words, when the spirally exposed edge portion 52 of the positive electrode current collector foil 51 is gathered into two parts in the wound electrode assembly 40, the edge portion 52 can be divided substantially uniformly in a well-balanced manner.

The present inventors prepared samples of the lithium-ion secondary battery to conduct various tests. The tests are described in the following.

The positive electrode of the lithium-ion secondary battery prepared here uses $LiNi_{1/3}Co_{1/3}Mn_{1/3}O_2$ powder (LNCM) as the positive electrode active material powder, acetylene black (AB) as the conductive agent, and polyvinylidene fluoride (PVDF) as the binder. These materials were mixed with N-methyl-pyrrolidone (NMP) so that the mass ratio became LNCM:AB:PVdF=92:5:3, to prepare a slurry composition. A long aluminum foil (positive electrode current collector) with a width of about 130 mm and a thickness of about 15 µm was prepared, and an exposed portion (uncoated portion) was set in one side edge thereof. The above-described slurry composition was coated in a width of 115 mm onto the foil continuously in a longitudinal direction except for the exposed portion, and thereafter dried (drying temperature 80° C., 1 minute), to form a positive electrode active material layer. This was rolled by a roller press, whereby a long positive electrode sheet was obtained. For the positive electrode sheet, the positive electrode active material layer was formed on both faces of the positive electrode current collector foil. The weight per unit area of the above-described slurry composition (positive electrode mixture) was set to be approximately the same on both faces of the positive electrode current collector foil. Here, the long positive electrode sheet was cut at an appropriate length, and a long positive electrode sheet (total thickness 110 µm, length 6000 mm) used for preparing a wound electrode assembly 40 was prepared.

Next, amorphous-coated spherical graphite powder (C) as the negative electrode active material, styrene-butadiene rubber (SBR) as a binder agent, and carboxymethylcellulose (CMC) as a thickening agent were prepared. These materials were mixed with ion exchange water so that the mass ratio became C:SBR:CMC=98:1:1, to prepare a slurry composition. A long copper foil (negative electrode current collector) with a width of about 135 mm and a thickness of about 10 μm was prepared, and an exposed portion (uncoated portion) was set in one side edge thereof. This slurry composition was coated in a width of 120 mm onto the foil continuously in a longitudinal direction except for the exposed portion, and thereafter dried (drying temperature 120° C., 1 minute), to form a negative electrode active material layer. This was rolled by a roller press, whereby a long negative electrode sheet was obtained. For the negative electrode sheet, the negative electrode active material layer was formed on both faces of the negative electrode current collector foil. The weight per unit area of the above-described slurry composition (negative electrode mixture) was set to be approximately the same on both faces of the negative electrode current collector foil. Here, the long negative electrode sheet was cut at an appropriate length, and a long negative electrode sheet (total thickness 120 μm, length 6150 mm) used for preparing a wound electrode assembly 40 was prepared.

The long positive electrode sheet and the long negative electrode sheet prepared in the above-described manner were stacked and wound together with separators interposed therebetween, to prepare a flat-shaped wound electrode assembly. When stacking the positive electrode sheet and the negative electrode sheet each other, the negative electrode sheet was made to jut out about 40 mm from the winding starting end of the positive electrode sheet at the starting end of the winding direction of the wound electrode assembly. The separator used here was such that a substrate material had a three-layer structure including polypropylene (PP) layers formed on both faces of a polyethylene (PE) layer, and a porous heat resistant layer containing alumina ($Al_2O_3$) particles and acrylic resin as a binder was provided on one surface of the substrate material. At first, the wound electrode assembly was wound into a cylindrical shape. Then, a winding fastening tape that is wider than the width of the negative electrode active material layer but is narrower than the width of the separators 72 and 74 is wound around the outermost portion of the wound electrode assembly. Thereafter, the resultant wound electrode assembly was pressed into a flat shape.

Then, the edge portion of the positive electrode current collector foil jutting out from the separators was gathered and welded to a positive electrode terminal. Likewise, the edge portion of the negative electrode current collector foil jutting out from the separators was gathered and welded to a negative electrode terminal.

The winding starting end portion 60a of the negative electrode sheet 60 was disposed at least 2 mm lower than a curved portion (upper curved portion) disposed at the top side of the wound electrode assembly 40. The winding starting end portion 50a of the positive electrode sheet 50 was disposed at least 6 mm lower than the curved portion disposed at the top side of the wound electrode assembly 40. The terminal end 60b of the negative electrode sheet 60 was disposed in the upper curved portion. The terminal ends of separators 72 and 74 were disposed in the lower curved portion. The edge portion 52 of the positive electrode current collector foil 51 was gathered at two locations in the flat linear portion, and the gathered parts were welded to the positive electrode terminal. The edge portion 62 of the negative electrode current collector foil 61 was gathered at two locations in the flat linear portion, and the gathered parts were welded to the negative electrode terminal. The reference position of the curved portion disposed on the upper side of the wound electrode assembly 40 is based on the inside position of the innermost winding of the negative electrode sheet that is wound most inwardly in the curved portion. In other words, the reference position of the curved portion (upper curved portion) disposed at the upper side of the wound electrode assembly 40 is the topmost portion of the upper curved portion of the negative electrode sheet. Note that in the later-described high temperature aging herein, the battery case 20 is arranged so that the case bottom faces downward. For this reason, the side of the battery case 20 that is provided with the sealing plate 22 (lid) is defined as the upper side, and the case bottom side of the battery case 20 is defined as the lower side, for convenience. Accordingly, the curved portion disposed on the side of the battery case 20 provided with the sealing plate 22 (lid) is referred to as "upper curved portion", while the curved portion disposed on the case bottom side is referred to as "lower curved portion". However, the upper and lower sides of the lithium-ion secondary battery as well as the upper and lower sides of the wound electrode assembly are not limited by the foregoing definition.

As illustrated in FIG. 6, the term "curved portion" refers to each of the curved regions C1 and C2 formed on opposite sides of "linear portions (L1 and L1)" in which the positive electrode sheet 50 and the negative electrode sheet 60 extend linearly, when the flat wound electrode assembly 40 is viewed in the direction of the winding axis WL. The term "lower curved portion (C2)" refers to one of the "curved portions" formed on opposite sides of the "linear portion" of the flat wound electrode assembly 40, the one being disposed facing the case bottom of the case main body 21 of the battery case 20 under the condition in which the wound electrode assembly 40 is enclosed in the battery case 20. The term "upper curved portion (C1)" refers to one of the "curved portions" formed on opposite sides of the "linear portion" of the flat wound electrode assembly 40, the one being disposed facing the sealing plate 22 of the battery case 20 under the condition in which the wound electrode assembly 40 is enclosed in the battery case 20.

Such a wound electrode assembly was enclosed in a prismatic case made of aluminum, and a non-aqueous electrolyte solution was filled therein. The amount of the non-aqueous electrolyte solution to be filled is set to be such an amount that the non-aqueous electrolyte solution is impregnated in the wound electrode assembly and moreover an excessive non-aqueous electrolyte solution exists in the gap between the wound electrode assembly and the prismatic case. The amount of the excessive non-aqueous electrolyte solution was adjusted so that the liquid level reached about ½ the height of the prismatic case. The non-aqueous electrolyte solution was the one prepared by dissolving $LiPF_6$ as a supporting salt at a concentration of 1 mol/L in a mixed solvent containing ethylene carbonate (EC), dimethyl carbonate (DMC), and ethyl methyl carbonate (EMC) in a volume ratio of EC:DMC:EMC=3:3:4, and adding cyclohexylbenzene in a proportion of 4 mass %.

Figure 8:
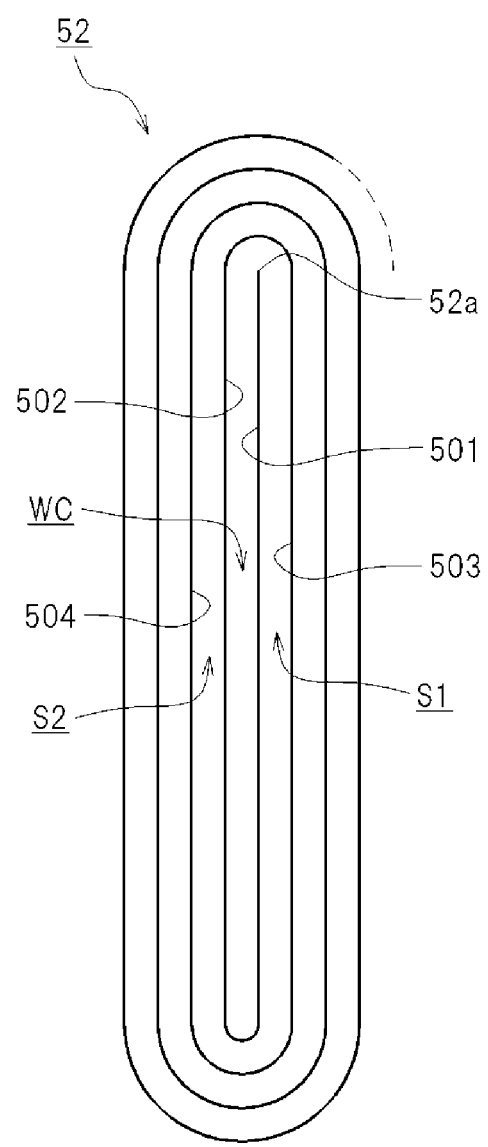
FIG. 8 is a side view schematically illustrating the edge portion 52 of the positive electrode current collector foil 51.
Figure 9:
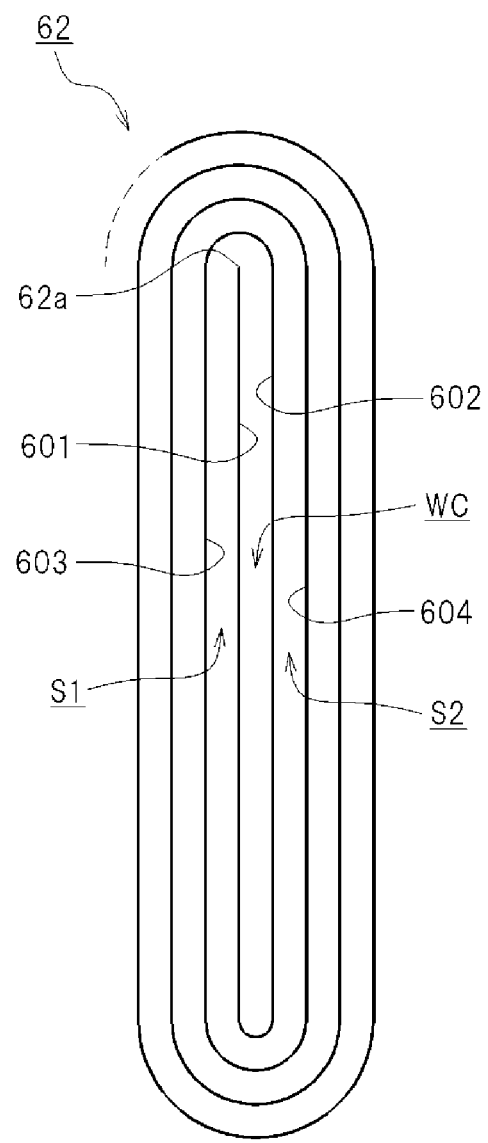
FIG. 9 is perspective view illustrating an exposed portion 62 of a negative electrode current collector foil 61.

Herein, 10 cells were prepared for each of three kinds of samples A to C. FIG. 8 is a side view schematically illustrating the edge portion 52 of the positive electrode current collector foil 51 that juts out from the separators 72 and 74 (see FIGS. 2 and 5). FIG. 9 is a side view schematically illustrating the edge portion 62 of the negative electrode current collector foil 61 that juts out from the separators 72 and 74. The edge portion 52 of the positive electrode current collector foil 51 and the edge portion 62 of the negative electrode current collector foil 61 jut out on opposite sides of the winding axis WL. As illustrated in FIGS. 8 and 9, the edge portion 52 of the positive electrode current collector foil 51 and the edge portion 62 of the negative electrode current collector foil 61 appear to be flipped horizontally, but, as illustrated in FIG. 6, the positive electrode sheet 50 and the negative electrode sheet 60 are wound in the same direction. With reference to FIGS. 8 and 9, the following describes the gap for dividing each of the edge portion 52 of the positive electrode current collector foil 51 and the edge portion 62 of the negative electrode current collector foil 61 in each of samples A to C when gathering the divided parts of each of the edge portion 52 of the positive electrode current collector foil 51 and the edge portion 62 of the negative electrode current collector foil 61 and welding them respectively to the positive electrode terminal and the negative electrode terminal.

Here, sample A is such a sample that each of the divided parts of the edge portions 52 and 62 of the positive and negative electrode current collector foil 51 and 61 is gathered in such a manner that the central portion WC is opened, as illustrated in FIG. 3. That is, in sample A, each of the edge portions 52 and 62 of the positive and negative electrode current collector foil 51 and 61 is divided and gathered into a plurality of parts at the gap of the central portion WC containing the winding axis WL (see FIG. 5). In other words, each of the edge portions 52 and 62 of the positive and negative electrode current collector foil 51 and 61 is divided and gathered into a plurality of parts at the gap (i.e., the gap of the central portion WC) between an edge portion 501 or 601, which is the first wound layer viewed from the central portion WC and is on the side where the winding starting end portion 52a or 62a exists, and an edge portion 502 or 602, which is also the first wound layer viewed from the central portion WC but is on the opposite side thereto.

Figure 10:
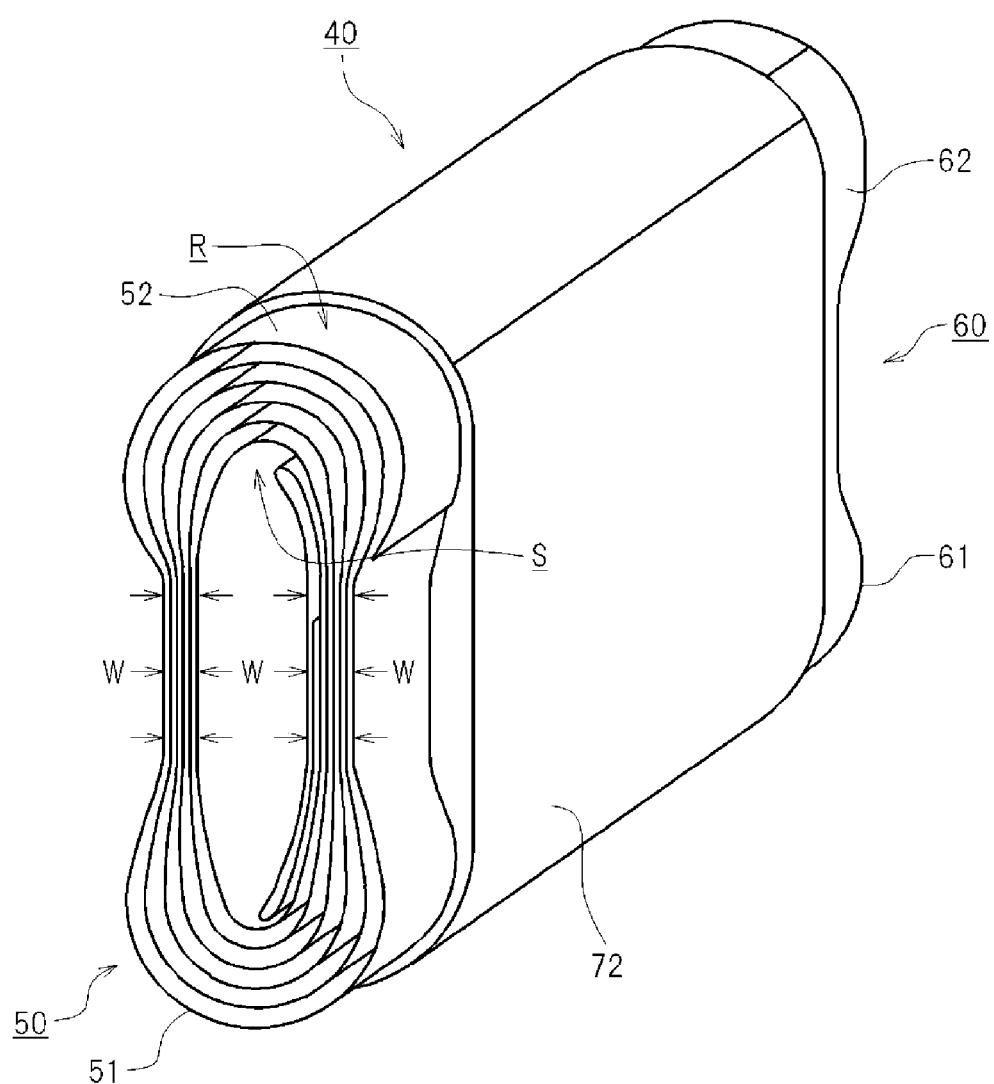
FIG. 10 is a perspective view illustrating a wound electrode body 40 according to another preferred embodiment of the invention.

Each of samples B and C is such a sample that each of the edge portions 52 and 62 of the positive and negative electrode current collector foils 51 and 61 is divided and gathered into a plurality of parts at one gap S1 or S2 among a plurality of gaps provided in a direction orthogonal to the winding axis WL excluding the central portion WC containing the winding axis WL. Specifically, in sample B, each of the edge portions 52 and 62 of the positive and negative electrode current collector foils 51 and 61, which are exposed from the separators 72 and 74, is divided at the gap S1 (see FIGS. 8 and 9) between the edge portion 501 or 601, which is the wound first layer viewed from the central portion WC and is on the side where the winding starting end portion 52a or 62a exists, and an edge portion 503 or 603, which the wound second layer viewed from the central portion WC (see FIG. 7). In sample C, each of the edge portions 52 and 62 of the positive and negative electrode current collector foils 51 and 61, which are exposed from the separators 72 and 74, is divided at the gap S2 (see FIGS. 8 and 9) between the edge portion 502 or 602, which is the first wound layer viewed from the central portion WC and is on the side where the winding starting end portion 52a or 62a exists, and an edge portion 504 or 604, which is the second wound layer viewed from the central portion WC (see FIG. 7). FIG. 10 shows an embodiment in which each of the edge portions 52 and 62 of the positive and negative electrode current collector foils 51 and 61 of the wound electrode assembly 40 is divided at the just-described gap S2 shown in FIGS. 8 and 9 and each of the divided parts is gathered. The edge portion 52 of the positive electrode current collector foil 51 and the edge portion 62 of the negative electrode current collector foil 61 are respectively gathered and welded to respective electrode terminals. The arrows W in FIG. 10 indicate the positions to be welded, as in FIG. 3.

<<Initial Charging Treatment, High Temperature Aging>

Samples A to C prepared in the above-described manner were subjected to an initial charging treatment and high temperature aging. Here, the lithium-ion secondary battery constructed in the above-described manner was clamped by a jig, and pressurized and confined so that the confining pressure became 400 kgf. Each of the samples was charged at a constant current of 20 A until the battery voltage reached 3.95 V, and thereafter constant-voltage charged at 3.95 V until the current reached 0.1 A. The samples of the lithium-ion secondary battery whose battery voltage were adjusted to 3.95 V were placed in a thermostatic chamber, then, the temperature was elevated to 80° C., and the samples were subjected to high temperature aging until the time elapsed since the start of the temperature elevation reached 20 hours. After the high temperature aging, the voltage of each of the samples was measured, then the samples were allowed to stand for one week, and the voltage of each of the samples was measured again. Then, the voltage change (ΔV) before and after the was determined.

As a result of the foregoing, for sample A, the micro-short circuits resulting from the dissolution of the positive electrode active material at the winding starting end portion 50a of the positive electrode sheet 50 were confirmed in 10 cells out of the 10 cells of sample A. For sample B, the micro-short circuits resulting from the dissolution of the positive electrode active material at the winding starting end portion 50a of the positive electrode sheet 50 were not observed in any of the cells. However, in some of the sample cells, charred marks of the separators 72 and 74 were observed in the adjacent region to the winding starting end portion 50a of the positive electrode sheet 50. This is believed to be due to the dissolution of the positive electrode active material at the winding starting end portion 50a of the positive electrode sheet 50. In other words, although the micro-short circuits could be inhibited, a slight evidence of the dissolution of the positive electrode active material was observed. For sample C, none of the cells showed the micro-short circuits resulting from the dissolution of the positive electrode active material at the winding starting end portion 50a of the positive electrode sheet 50 or the traces resulting from the dissolution of the positive electrode active material at the winding starting end portion 50a.

Thus, in sample A, the micro-short circuits resulting from the dissolution of the positive electrode active material at the winding starting end portion 50a of the positive electrode sheet 50 were observed. Thus, it is believed that the micro-short circuits tend to be detected in the embodiment in which each of the edge portions 52 and 62 of the positive and negative electrode current collector foil 51 and 61 is divided and gathered into a plurality of parts at the gap of the central portion WC containing the winding axis WL (see FIG. 5).

For samples B and C, the micro-short circuits resulting from the dissolution of the positive electrode active material at the winding starting end portion 50a of the positive electrode sheet 50 were not detected. Thus, it is believed that the micro-short circuits are unlikely to occur when each of the edge portions 52 and 62 of the positive and negative electrode current collector foil 51 and 61 is divided and gathered into a plurality of parts at one gap S1 or S2, excluding the central portion WC containing the winding axis, among the plurality of gaps provided between layers of the current collector foils stacked in a direction orthogonal to the winding axis WL. In other words, it is desirable that two edge parts within the spirally exposed edge portion 52 of the positive electrode current collector foil 51 be gathered into one piece, the two edge parts being positioned respectively on opposite sides of the central portion WC along a direction orthogonal to the winding axis WL. It is also desirable that two edge parts within the spirally exposed edge portion 62 of the negative electrode current collector foil 61 be gathered into one piece, the two edge parts being positioned respectively on opposite sides of the central portion WC along a direction orthogonal to the winding axis WL.

What is more, sample C is less likely to cause the micro-short circuits resulting from the dissolution of the positive electrode active material at the winding starting end portion 50a of the positive electrode sheet 50 than sample B. Thus, it is believed that the micro-short circuits are less likely to occur when the edge portion is divided and gathered into a plurality of parts at the gap S2, which is somewhat away from the central portion WC containing the winding axis WL with respect to a direction orthogonal to the winding axis WL, than when the edge portion is divided and gathered at the gap S1, which is closer to the central portion WC containing the winding axis WL. In addition, in sample B, the winding starting end portion 52a of the spirally exposed edge portion 52 of the positive electrode current collector foil 51 is disposed inside one of the gathered parts of the positive electrode current collector foil 51. Moreover, the winding starting end portion 62a of the spirally exposed edge portion 62 of the negative electrode current collector foil 61 is also disposed inside one of the gathered parts of the negative electrode current collector foil 61. Therefore, it is believed that the winding starting end portion 63a of the negative electrode active material layer 63 is more reliably prevented from making contact with air, and the micro-short circuits become further less likely to occur.

From the viewpoint of preventing the micro-short circuits resulting from the dissolution of the positive electrode active material from the winding starting end portion 50a of the positive electrode sheet 50, it is desirable that at least a portion of the spirally exposed edge portion 52 of the positive electrode current collector foil 51 that extends from the winding starting end thereof to the first turn thereof be gathered into one piece, and also at least a portion of the spirally exposed edge portion 62 of the negative electrode current collector foil 61 that extends from the winding starting end thereof to the first turn thereof be gathered into one piece. Furthermore, it is desirable that at least a portion of the spirally exposed edge portion 52 of the positive electrode current collector foil 51 that extends from the winding starting end thereof to the second turn thereof be gathered into one piece, and that at least a portion of the spirally exposed edge portion 62 of the negative electrode current collector foil 61 that extends from the winding starting end thereof to the second turn thereof be gathered into one piece.

Hereinabove, various embodiments of the lithium-ion secondary battery and the method of manufacturing the battery proposed herein have been described, but the present invention is not limited by any of the foregoing embodiments.

For example, although a prismatic battery having a flat wound electrode assembly has been illustrated in the examples herein, the structure of the lithium-ion secondary battery is not limited to these examples unless specifically stated otherwise, and the present invention can be applied to various types of batteries. For example, the invention is also applicable to a cylindrical wound electrode assembly. In the cylindrical wound electrode assembly, it is desirable that the spirally exposed edge portion of the positive electrode current collector foil be divided and gathered into a plurality of parts at at least one of a plurality of gaps, excluding the central portion containing the winding axis WL, provided between wound layers of the positive electrode current collector foil stacked in a direction orthogonal to the winding axis WL. Also, it is desirable that the spirally exposed edge portion of the negative electrode current collector foil be divided and gathered into a plurality of parts at at least one of a plurality of gaps, excluding the central portion containing the winding axis, provided between wound layers of the negative electrode current collector foil stacked in a direction orthogonal to the winding axis WL.

It is desirable that the lithium-ion secondary battery comprise a wound electrode assembly. The lithium-ion secondary battery in which the battery case is a metal case (hard case) has been illustrated in the examples herein. The battery case is not limited thereto. The battery case may be made of, for example a laminate sheet, which forms a laminate-type battery.

The lithium-ion secondary battery 10 proposed herein can prevent the micro-short circuits resulting from the dissolution of the positive electrode active material from the winding starting end portion 50a of the positive electrode sheet 50. In particular, it can prevent the micro-short circuits resulting from the dissolution of the positive electrode active material from the winding starting end portion 50a of the positive electrode sheet 50 caused by the high temperature aging before shipping. As a result, the number of the products that are determined as defective can be reduced in the high temperature aging before shipping, and the production yield is improved. In addition to this, the lithium-ion secondary battery 10 proposed herein more reliably prevents the winding starting end portion 63a (see FIGS. 4 and 6) of the negative electrode active material layer 63 from making contact with air. For this reason, even if a large amount of air remains in the battery case 20 in the manufacturing process, the micro-short circuits can be prevented, and the lithium-ion secondary battery 10 is allowed to exhibit stable performance. Moreover, the lithium-ion secondary battery 10 proposed herein can prevent the micro-short circuits in the use conditions at a high potential, and therefore, the lithium-ion secondary battery 10 is suitable for use in such applications that charging and discharging at high rate are repeated.

As described above, in the lithium-ion secondary battery 10 proposed herein, the winding starting end portion 60a of the negative electrode sheet 60 that is opposed to the winding starting end portion 50a of the positive electrode sheet 50 is placed and enclosed inside the gathered part, and the winding starting end portion 63a (see FIGS. 4 and 6) of the negative electrode active material layer 63 is more reliably prevented from making contact with air. Moreover, the electrolyte solution 80 is sufficiently impregnated in the winding starting end portion 63a of the negative electrode active material layer 63 by capillary action. For this reason, the micro-short circuits resulting from the dissolution of the positive electrode active material from the winding starting end portion 50a of the positive electrode sheet 50 are unlikely to occur during the high temperature aging. In this case, the micro-short circuits resulting from the dissolution of the positive electrode active material from the winding starting end portion 50a of the positive electrode sheet 50 are unlikely to occur irrespective of the arrangement of the lithium-ion secondary battery during the high temperature aging.

On the other hand, the management of the winding starting end portion 60a of the negative electrode sheet 60 is difficult in the embodiment as illustrated in FIG. 3, in which each of the exposed portions 52 and 62 of the positive and negative electrode current collector foils 51 and 61 is divided and gathered into two sets along the thickness direction at the central portion WC containing the winding axis WL. More specifically, the micro-short circuits resulting from the dissolution of the positive electrode active material at the winding starting end portion 50a of the positive electrode sheet 50 at the time of high temperature aging are unlikely to occur in the case where the winding starting end portion 60a of the negative electrode sheet 60 that is opposed to the winding starting end portion 50a of the positive electrode sheet 50 is immersed in the electrolyte solution 80 at the time of high temperature aging. Accordingly, with the embodiment shown in FIG. 3, it is necessary to carefully plan the arrangement of the battery in high temperature aging so that, for example, the winding starting end portion 60a of the negative electrode sheet 60 is placed downward in order to immerse the winding starting end portion 60a of the negative electrode sheet 60 in the electrolyte solution 80 at the time of high temperature aging. Moreover, it is necessary to take such an action that the amount of the excess electrolyte solution is increased by filling the electrolyte solution 80 in a larger amount so that the winding starting end portion 60a of the negative electrode sheet 60 can be reliably immersed in the electrolyte solution.

Furthermore, the micro-short circuits resulting from the dissolution of the positive electrode active material at the time of high temperature aging can be a problem also at the winding terminal end portion 50b of the positive electrode sheet 50 and at the winding terminal end portion 60b of the negative electrode sheet 60 (see FIG. 4). For this reason, in the embodiment shown in FIG. 3, it is necessary to manage the winding starting end portions 50a and 60a and the winding terminal end portions 50b and 60b in the wound electrode assembly 40 at the same time. Corresponding to this issue, there has been a great deal of constraints in battery design and manufacture, such as the number of winding turns of the wound electrode assembly 40, the arrangement of the wound electrode assembly 40 in the battery case, and the arrangement of lithium-ion secondary battery 10 in the high temperature aging.

The lithium-ion secondary battery 10 proposed herein alleviates the management of the winding starting end portions 50a and 60a at the time of high temperature aging. Accordingly, this alleviates various constraints in battery design and manufacture, such as the number of winding turns of the wound electrode assembly 40, the arrangement of the wound electrode assembly 40 in the battery case, and the arrangement of the lithium-ion secondary battery 10 in the high temperature aging. Moreover, as for the excess electrolyte solution, it is unnecessary to provide the excess electrolyte solution in an amount greater than necessary in such a manner that the winding starting end portion 60a of the negative electrode sheet 60 can be reliably immersed in the electrolyte solution.

Therefore, the lithium-ion secondary battery 10 proposed herein is particularly suitable for, for example, a vehicle driving battery that requires stable performance. The vehicle driving battery may be in the form of battery module in which a plurality of the lithium-ion secondary batteries 10 are connected in series. Typical examples of the vehicle equipped with such a vehicle driving battery as its electric power source include automobiles, particularly automobiles having an electric motor, such as hybrid automotive vehicles (including plug-in hybrid automotive vehicles) and electric automotive vehicles.

Although various embodiments of the present invention have been described in detail hereinabove, it should be understood that the foregoing embodiments are merely exemplary and are not intended to limit the scope of the claims. Various modifications and alterations of the above-described examples are within the scope of the invention as defined by the appended claims.

REFERENCE SIGNS LIST

10—Lithium-ion secondary battery (non-aqueous electrolyte secondary battery)
20—Battery case
21—Case main body
22—Sealing plate
23—Positive electrode terminal (electrode terminal)
23a—Tip portion of positive electrode terminal (retaining portion)
24—Negative electrode terminal (electrode terminal)
24a—Tip portion of negative electrode terminal (retaining portion)
30—Safety vent
32—Filling port
33—Sealing material
40—Wound electrode assembly (electrode assembly)
50—Positive electrode sheet
50a—Winding starting end portion of positive electrode sheet
51—Positive electrode current collector foil
51a—Winding starting end portion of positive electrode current collector foil
52—Edge portion (exposed portion) of positive electrode current collector foil
52a—Winding starting end portion of edge portion (exposed portion) of positive electrode current collector foil
52c, 52d—Edge parts of positive electrode current collector foil positioned on opposite sides of central portion WC
53—Positive electrode active material layer
53a—Winding starting end portion of positive electrode active material layer
60—Negative electrode sheet
60a—Winding starting end portion of negative electrode sheet
60b—Terminal end of negative electrode sheet
61—Negative electrode current collector foil
62—Edge portion (exposed portion) of negative electrode current collector foil
62a—Winding starting end portion of edge portion (exposed portion) of negative electrode current collector foil
62b—Winding terminal end portion of edge portion (exposed portion) of negative electrode current collector foil
63—Negative electrode active material layer
63a—Winding starting end portion of negative electrode active material layer
72, 74—Separator
S, S1, S2—Gap
WC—Winding center (central portion)
WL—Winding axis

The invention claimed is:

1. A lithium-ion secondary battery comprising:
a battery case;
a wound electrode assembly enclosed in the battery case; and
an electrolyte solution enclosed in the battery case,
the wound electrode assembly including:
a positive electrode current collector foil including an edge portion exposed in a spiral form at one end of a winding axis; and
a negative electrode current collector foil including an edge portion exposed in a spiral form at the other end of the winding axis, wherein
the spirally exposed edge portion of the positive electrode current collector foil is divided and gathered into a plurality of parts at at least one of a plurality of gaps, excluding a central portion containing the winding axis, provided between wound layers of the positive electrode current collector foil stacked in a direction orthogonal to the winding axis; and
the spirally exposed edge portion of the negative electrode current collector foil is divided and gathered into a plurality of parts at at least one of a plurality of gaps, excluding a central portion containing the winding axis, provided between wound layers of the negative electrode current collector foil stacked in a direction orthogonal to the winding axis.

2. The lithium-ion secondary battery according to claim 1, wherein two parts of the spirally exposed edge portion of the positive electrode current collector foil are gathered into one piece, the two parts of the spirally exposed edge portion being positioned respectively on opposite sides of the central portion along a direction orthogonal to the winding axis.

3. The lithium-ion secondary battery according to claim 1, wherein at least a portion of the spirally exposed edge portion of the positive electrode current collector foil that extends from a winding starting end thereof to a first turn thereof is gathered into one piece.

4. The lithium-ion secondary battery according to claim 1, wherein the spirally exposed edge portion of the positive electrode current collector foil has a winding starting end portion disposed inside one of the gathered parts of the positive electrode current collector foil.

5. The lithium-ion secondary battery according to claim 1, wherein at least a portion of the spirally exposed edge portion of the positive electrode current collector foil that extends from a winding starting end thereof to a second turn thereof is gathered into one piece.

6. The lithium-ion secondary battery according to claim 1, wherein the spirally exposed edge portion of the positive electrode current collector foil is divided at one gap selected from first to fourth gaps from the central portion containing the winding axis, among the plurality of gaps provided in a direction orthogonal to the winding axis.

7. The lithium-ion secondary battery according to claim 1, wherein two parts of the spirally exposed edge portion of the negative electrode current collector foil are gathered into one piece, the two parts of the spirally exposed edge portion being positioned respectively on opposite sides of the central portion along a direction orthogonal to the winding axis.

8. The lithium-ion secondary battery according to claim 1, wherein at least a portion of the spirally exposed edge portion of the negative electrode current collector foil that extends from a winding starting end thereof to a first turn thereof is gathered into one piece.

9. The lithium-ion secondary battery according to claim 1, wherein the spirally exposed edge portion of the negative electrode current collector foil has a winding starting end portion disposed inside one of the gathered parts of the negative electrode current collector foil.

10. The lithium-ion secondary battery according to claim 1, wherein a portion of the spirally exposed edge portion of the negative electrode current collector foil that extends from a winding starting end thereof to a second turn thereof is gathered into one piece.

11. The lithium-ion secondary battery according to claim 1, wherein the spirally exposed edge portion of the negative electrode current collector foil is divided at one gap selected from first to fourth gaps from the central portion containing the winding axis, among the plurality of gaps provided in a direction orthogonal to the winding axis.

12. The lithium-ion secondary battery according to claim 1, wherein:
the wound electrode assembly comprises:
a positive electrode active material layer retained on the strip-shaped positive electrode current collector foil; and
a negative electrode active material layer retained on the strip-shaped negative electrode current collector foil,
the positive electrode current collector foil and the negative electrode current collector foil being oriented in a common longitudinal direction, and being stacked together with separators interposed between the positive electrode active material layer and the negative electrode active material layer, and being wound around the winding axis set along a width direction of the strip-shaped positive electrode current collector foil, wherein:
in the central portion containing the winding axis, the negative electrode active material layer is disposed closer to the winding axis than the positive electrode active material layer; and
a winding starting end portion of the negative electrode active material layer juts out from a winding starting end portion of the positive electrode active material layer in a winding direction around the winding axis.

13. The lithium-ion secondary battery according to claim 1, wherein:
the battery case is a prismatic case having an accommodating space in a flat parallelepiped shape;
the wound electrode assembly is enclosed in the battery case in a flat condition along a plane containing the winding axis; and
each of the gathered region of the positive electrode current collector foil and the gathered region of the negative electrode current collector foil is gathered into a linear line shape along the plane.

14. The lithium-ion secondary battery according to claim 1, further comprising:
a positive electrode terminal attached to the battery case; and
a negative electrode terminal attached to the battery case,
the positive electrode terminal including a retaining portion retaining at least two gathered regions of the positive electrode current collector foil; and
the negative electrode terminal including a retaining portion retaining at least two gathered regions of the positive electrode current collector foil.

15. A method of manufacturing a lithium-ion secondary battery, comprising:
preparing a wound electrode assembly;
attaching a positive electrode terminal to the wound electrode assembly; and attaching a negative electrode terminal to the wound electrode assembly, the prepared wound electrode assembly including:
- a positive electrode current collector foil having an edge portion exposed in a spiral form at one end of a winding axis; and
- a negative electrode current collector foil having an edge portion exposed in a spiral form at the other end of the winding axis, wherein:

the step of attaching a positive electrode terminal includes:

dividing and gathering the spirally exposed edge portion of the positive electrode current collector foil into a plurality of parts at at least one of a plurality of gaps, excluding a central portion containing the winding axis, provided between wound layers of the positive electrode current collector foil stacked in a direction orthogonal to a winding axis; and attaching the edge portion to the positive electrode terminal; and the step of attaching a negative electrode terminal includes:

dividing and gathering the spirally exposed edge portion of the negative electrode current collector foil into a plurality of parts at at least one of a plurality of gaps, excluding the central portion containing the winding axis, provided between wound layers of the negative electrode current collector foil stacked in a direction orthogonal to a winding axis; and attaching the edge portion to the negative electrode terminal.

16. The method according to claim 15, further comprising a step of inspecting the prepared lithium-ion secondary battery by high temperature aging.

\* \* \* \* \*